US012524536B2

(12) United States Patent
Tomoda et al.

(10) Patent No.: US 12,524,536 B2
(45) Date of Patent: Jan. 13, 2026

(54) SERVICE PROVIDING SYSTEM, SERVICE PROVIDING METHOD AND PROGRAM

(71) Applicant: RAKUTEN GROUP, INC., Tokyo (JP)

(72) Inventors: Kyosuke Tomoda, Tokyo (JP); Shuhei Ito, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 407 days.

(21) Appl. No.: 17/910,338

(22) PCT Filed: Jun. 30, 2021

(86) PCT No.: PCT/JP2021/024839
§ 371 (c)(1),
(2) Date: Sep. 8, 2022

(87) PCT Pub. No.: WO2023/276071
PCT Pub. Date: Jan. 5, 2023

(65) Prior Publication Data
US 2024/0427886 A1     Dec. 26, 2024

(51) Int. Cl.
*G06F 21/56*     (2013.01)
(52) U.S. Cl.
CPC ........ *G06F 21/56* (2013.01); *G06F 2221/034* (2013.01)
(58) Field of Classification Search
CPC .................. G06F 21/56; G06F 2221/034
See application file for complete search history.

(56) References Cited

U.S. PATENT DOCUMENTS

| | | | |
|---|---|---|---|
| 10,943,237 B2* | 3/2021 | Eramian | G06Q 20/4016 |
| 2004/0006695 A1 | 1/2004 | Ishibashi et al. | |
| 2008/0244269 A1 | 10/2008 | Ishibashi et al. | |
| 2014/0053227 A1* | 2/2014 | Ruppin | H04L 63/20 726/1 |

(Continued)

FOREIGN PATENT DOCUMENTS

| | | |
|---|---|---|
| CN | 110942308 A | 3/2020 |
| JP | 2003016397 A | 1/2003 |

(Continued)

OTHER PUBLICATIONS

Office Action of Jun. 28, 2023, for related TW Patent Application No. 111121032. See pp. 1-10. (For concise explanation of relevance, see relevance code on p. 10.).

(Continued)

*Primary Examiner* — Michael Simitoski
*Assistant Examiner* — Zhe Liu
(74) *Attorney, Agent, or Firm* — HEA Law PLLC

(57) ABSTRACT

A service providing system provides a service allowed to be logged in to from each of a plurality of user terminals. At least one processor is configured to execute predetermined authentication for each of the user terminals under a state in which the service has been logged in to from the user terminal. The at least one processor performs a setting relating to the service for each of the user terminals based on whether the authentication has been executed from the user terminal. The service is provided to each of the user terminals based on the setting of the user terminal.

14 Claims, 20 Drawing Sheets

(56) References Cited

U.S. PATENT DOCUMENTS

| | | | |
|---|---|---|---|
| 2014/0343975 A1 | 11/2014 | Nanjo et al. | |
| 2015/0281222 A1* | 10/2015 | Burch | H04L 63/0838 726/6 |
| 2016/0269385 A1* | 9/2016 | Siddiqui | H04W 4/80 |
| 2017/0142589 A1* | 5/2017 | Park | H04L 63/0861 |
| 2017/0244695 A1* | 8/2017 | Lund | H04L 63/083 |
| 2017/0262845 A1* | 9/2017 | Eisen | G06Q 20/02 |
| 2018/0255059 A1* | 9/2018 | Ren | H04L 63/0884 |
| 2019/0036923 A1* | 1/2019 | Xuan | H04L 67/63 |
| 2019/0197539 A1* | 6/2019 | Chang | G06Q 20/405 |
| 2020/0092282 A1* | 3/2020 | Childress | G06F 21/44 |
| 2020/0134626 A1* | 4/2020 | Abouelenin | G06Q 20/12 |
| 2021/0281572 A1* | 9/2021 | Fernandez-Spadaro | H04L 63/083 |
| 2022/0116404 A1* | 4/2022 | Manasse | H04L 63/1433 |
| 2022/0138116 A1* | 5/2022 | Lang | G06F 3/121 710/72 |
| 2022/0351178 A1* | 11/2022 | Ryoo | G06Q 20/352 |

FOREIGN PATENT DOCUMENTS

| | | |
|---|---|---|
| JP | 2006252110 A | 9/2006 |
| JP | 2010277498 A | 12/2010 |
| JP | 2013182315 A | 9/2013 |
| JP | 2017041001 A | 2/2017 |
| JP | 2018116697 A | 7/2018 |

OTHER PUBLICATIONS

International Search Report of Sep. 28, 2021, relating International Patent Application for PCT/JP2021/024839, pp. 1-9.

Office Action of Jun. 7, 2022, for related JP application No. 2021-109370 with partial English translation, pp. 1-4.

"A blue badge appears next to a display name", [online], retrieved on Jun. 10, 2021, the Internet, <URL:https://paypay.ne.jp/help/c0029/> pp. 1-3 (See English abstract).

* cited by examiner

| USER ID | PASSWORD | FULL NAME | ADDRESS | TELEPHONE NUMBER | REGISTERED INDIVIDUAL NUMBER | TERMINAL ID | POSSESSION AUTHENTICATION FLAG | USAGE SETTING |
|---|---|---|---|---|---|---|---|---|
| taro.yamada123 | ******** | TARO YAMADA | ... SETAGAYA WARD, TOKYO | 03-XXXX-YYYY | 1234567890123456 | 22391023 | 1 | USAGE SETTING |
| | | | | | | 39090295 | 0 | SOME SERVICES |
| hanako.suzuki999 | ******* | HANAKO SUZUKI | ... YOKOHAMA CITY, KANAGAWA | 090-CCCC-DDDD | 29109871317311928 | 38101283 | 1 | USAGE SETTING |
| | | | | | | 89217844 | 2 | USAGE SETTING |
| kimura9876 | ********** | JIRO KIMURA | ... MINATO WARD, TOKYO | 080-EEEE-FFFF | 71901935000 1321 | 67533190 | 1 | USAGE SETTING |
| | | | | | | 17113730 | 0 | SOME SERVICES |
| ... | ... | ... | ... | ... | ... | ... | ... | ... |

| USER ID | PASSWORD | FULL NAME | PAYMENT SOURCE | REGISTERED CARD INFORMATION ||||||| ELECTRONIC CASH INFORMATION ||
| --- | --- | --- | --- | --- | --- | --- | --- | --- | --- | --- | --- |
| | | | | No | CARD NUMBER | EXPIRATION DATE | CARD HOLDER | POSSESSION AUTHENTICATION FLAG | USAGE SETTING | ELECTRONIC CASH ID | BALANCE |
| taro.yamada123 | ******** | TARO YAMADA | CARD 1 | 1 | 1234567890123456 | 2023/5/10 | TARO YAMADA | 0 | 100,000 YEN | c00001 | 4000 |
| | | | | 2 | 9876543210987654 | 2022/6/21 | TARO YAMADA | 1 | 100,000 YEN | | |
| hanako.suzuki999 | ******* | HANAKO SUZUKI | CARD 2 | 1 | 2987097310731378 | 2021/11/25 | HANAKO SUZUKI | 2 | 100,000 YEN | c00002 | 6000 |
| | | | | 2 | 3842341033771113 | 2024/8/30 | HANAKO SUZUKI | 0 | 100,000 YEN | | |
| | | | | 3 | 7131317424324141 | 2023/2/15 | MIKI OKAMOTO | 0 | 30,000 YEN | | |
| kimura9876 | ********** | JIRO KIMURA | ELECTRONIC CASH | 1 | 4981723741243913 | 2022/11/24 | JIRO KIMURA | 0 | 30,000 YEN | c00003 | 2000 |
| ... | ... | ... | ... | ... | ... | ... | ... | ... | ... | ... | ... |

| USER ID | REGISTERED CARD INFORMATION ||| REGISTERED SECURITY CODE | REGISTERED ELECTRONIC MONEY ID |
|---|---|---|---|---|---|
| | CARD NUMBER | EXPIRATION DATE | CARD HOLDER | | |
| taro.yamada123 | 9876543210987654 | 2022/6/21 | TARO YAMADA | *** | ABCD1234567890 12 |
| hanako.suzuki999 | 2987097310731378 | 2021/11/25 | HANAKO SUZUKI | *** | XRJT291817489097 |
| kimura9876 | 4981723741243913 | 2022/11/24 | JIRO KIMURA | *** | GIRK8710928437912 |
| . . . | . . . | . . . | . . . | . . . | . . . |

REGISTERED CARD INFORMATION / ELECTRONIC CASH INFORMATION

| USER ID | PASSWORD | FULL NAME | PAYMENT SOURCE | No | CARD NUMBER | EXPIRATION DATE | CARD HOLDER | TERMINAL ID | POSSESSION AUTHENTICATION FLAG | USAGE SETTING | ELECTRONIC CASH ID | BALANCE |
|---|---|---|---|---|---|---|---|---|---|---|---|---|
| taro.yamada123 | ******** | TARO YAMADA | CARD 1 | 1 | 1234567890123456 | 2023/5/10 | TARO YAMADA | 22391023 | 1 | 100,000 YEN | | |
| | | | | | | | | 39090295 | 0 | 30,000 YEN | | |
| | | | | 2 | 9876543210987654 | 2022/6/21 | TARO YAMADA | 22391023 | 2 | 70,000 YEN | | |
| | | | | | | | | 39090295 | 0 | 30,000 YEN | c00001 | 4000 |
| | | | | | | | | 38101283 | 1 | 100,000 YEN | | |
| hanako.suzuki999 | ****** | HANAKO SUZUKI | CARD 2 | 1 | 2987097310731378 | 2021/11/25 | HANAKO SUZUKI | 89217844 | 2 | 70,000 YEN | | |
| | | | | | | | | 67533190 | 0 | 30,000 YEN | | |
| | | | | 2 | 3842341033771113 | 2024/8/30 | HANAKO SUZUKI | 38101283 | 0 | 30,000 YEN | | |
| | | | | | | | | 89217844 | 1 | 100,000 YEN | c00002 | 6000 |
| | | | | | | | | 67533190 | 0 | 30,000 YEN | | |
| | | | | 3 | 7131317424324141 | 2023/2/15 | MIKI OKAMOTO | 38101283 | 2 | 70,000 YEN | | |
| | | | | | | | | 89217844 | 1 | 100,000 YEN | | |
| | | | | | | | | 67533190 | 1 | 100,000 YEN | | |
| kimura9876 | ********** | JIRO KIMURA | ELECTRONIC CASH | 1 | 4981723741243913 | 2022/11/24 | JIRO KIMURA | 17113730 | 0 | 30,000 YEN | c00003 | 2000 |
| ... | ... | ... | ... | ... | ... | ... | ... | | | | ... | ... |

| USER ID | PASSWORD | FULL NAME | PAYMENT SOURCE | REGISTERED CARD INFORMATION ||||||||  ELECTRONIC CASH INFORMATION ||
| | | | | No | CARD NUMBER | EXPIRATION DATE | CARD HOLDER | TERMINAL ID | POSSESSION AUTHENTICATION FLAG | RELIABILITY LEVEL | USAGE SETTING | ELECTRONIC CASH ID | BALANCE |
|---|---|---|---|---|---|---|---|---|---|---|---|---|---|
| taro.yamada123 | ******* | TARO YAMADA | CARD 1 | 1 | 1234567890123456 | 2023/5/10 | TARO YAMADA | 22391023 | 1 | 70 | 70,000 YEN | | |
| | | | | | | | | 39090295 | 0 | 20 | 20,000 YEN | c00001 | 4000 |
| | | | | 2 | 9876543210987654 | 2022/6/21 | TARO YAMADA | 22391023 | 2 | 50 | 50,000 YEN | | |
| | | | | | | | | 39090295 | 0 | 30 | 30,000 YEN | | |
| hanako.suzuki999 | ****** | HANAKO SUZUKI | CARD 2 | 1 | 2987097310731378 | 2021/11/25 | HANAKO SUZUKI | 38101283 | 1 | 80 | 80,000 YEN | | |
| | | | | | | | | 89217844 | 2 | 60 | 60,000 YEN | | |
| | | | | | | | | 67533190 | 0 | 30 | 30,000 YEN | c00002 | 6000 |
| | | | | 2 | 3842341033771113 | 2024/8/30 | HANAKO SUZUKI | 38101283 | 0 | 20 | 20,000 YEN | | |
| | | | | | | | | 89217844 | 1 | 70 | 70,000 YEN | | |
| | | | | | | | | 67533190 | 0 | 40 | 40,000 YEN | | |
| | | | | 3 | 7131317424324141 | 2023/2/15 | MIKI OKAMOTO | 38101283 | 2 | 30 | 30,000 YEN | | |
| | | | | | | | | 89217844 | 1 | 15 | 15,000 YEN | | |
| | | | | | | | | 67533190 | 1 | 15 | 15,000 YEN | | |
| kimura9876 | ********* | JIRO KIMURA | ELECTRONIC CASH | 1 | 4981723741243913 | 2022/11/24 | JIRO KIMURA | 17113730 | 0 | 20 | 20,000 YEN | c00003 | 2000 |
| ... | ... | ... | ... | ... | ... | ... | ... | ... | ... | ... | ... | ... | ... |

SERVICE PROVIDING SYSTEM, SERVICE PROVIDING METHOD AND PROGRAM

CROSS REFERENCE TO RELATED APPLICATIONS

This application is a National Stage of International Application No. PCT/JP2021/024839 filed on Jun. 30, 2021. The contents of the above document is incorporated herein by reference in its entirety.

TECHNICAL FIELD

The present disclosure relates to a service providing system, a service providing method, and a program.

BACKGROUND ART

Hitherto, there are known technologies for suppressing fraudulent use by a malicious third party in various services. For example, in Patent Literature 1, there is described a technology in which login to a service is executed based on a user ID and a password input from a user terminal, to thereby suppress fraudulent use by a third party.

CITATION LIST

Patent Literature

[PTL 1] JP 2018-116697 A

SUMMARY OF INVENTION

Technical Problem

However, in the technology as described in Patent Literature 1, there is a fear in that, when a third party illegally obtains a user ID and a password, the third party may illegally log in from his or her own user terminal through use of the illegally obtained user ID and password. There is also a fear in that, for example, the third party may change a setting relating to the service without permission in order to facilitate fraudulent use from his or her own user terminal. Accordingly, with only such authentication at a time of login as in the technology as described in Patent Literature 1, fraudulent use by a third party cannot be sufficiently suppressed and security cannot be enhanced.

The present disclosure has an object to enhance security.

Solution to Problem

According to one aspect of the present disclosure, there is provided a service providing system for providing a service allowed to be logged in to from each of a plurality of user terminals, the service providing system including: authentication means for executing predetermined authentication for each of the plurality of user terminals under a state in which the service has been logged in to from each of the plurality of user terminals; setting means for performing a setting relating to the service for each of the plurality of user terminals based on whether the predetermined authentication has been executed from each of the plurality of user terminals; and providing means for providing the service to each of the plurality of user terminals based on the setting of each of the plurality of user terminals.

Advantageous Effects of Invention

According to the present disclosure, the security is enhanced.

BRIEF DESCRIPTION OF DRAWINGS

FIG. 6 is a table for showing a data storage example of a user database.

FIG. 13 is a table for showing a data storage example of the user database.

FIG. 14 is a table for showing a data storage example of a card database.

FIG. 18 is a table for showing a data storage example of a user database in Modification Example 1-1.

FIG. 19 is a table for showing a data storage example of a user database in Modification Example 1-2.

DESCRIPTION OF EMBODIMENTS

1. First Embodiment

Now, an example of a service providing system according to a first embodiment of the present disclosure is described.

1-1. Overall Configuration of Service Providing System

Figure 1:
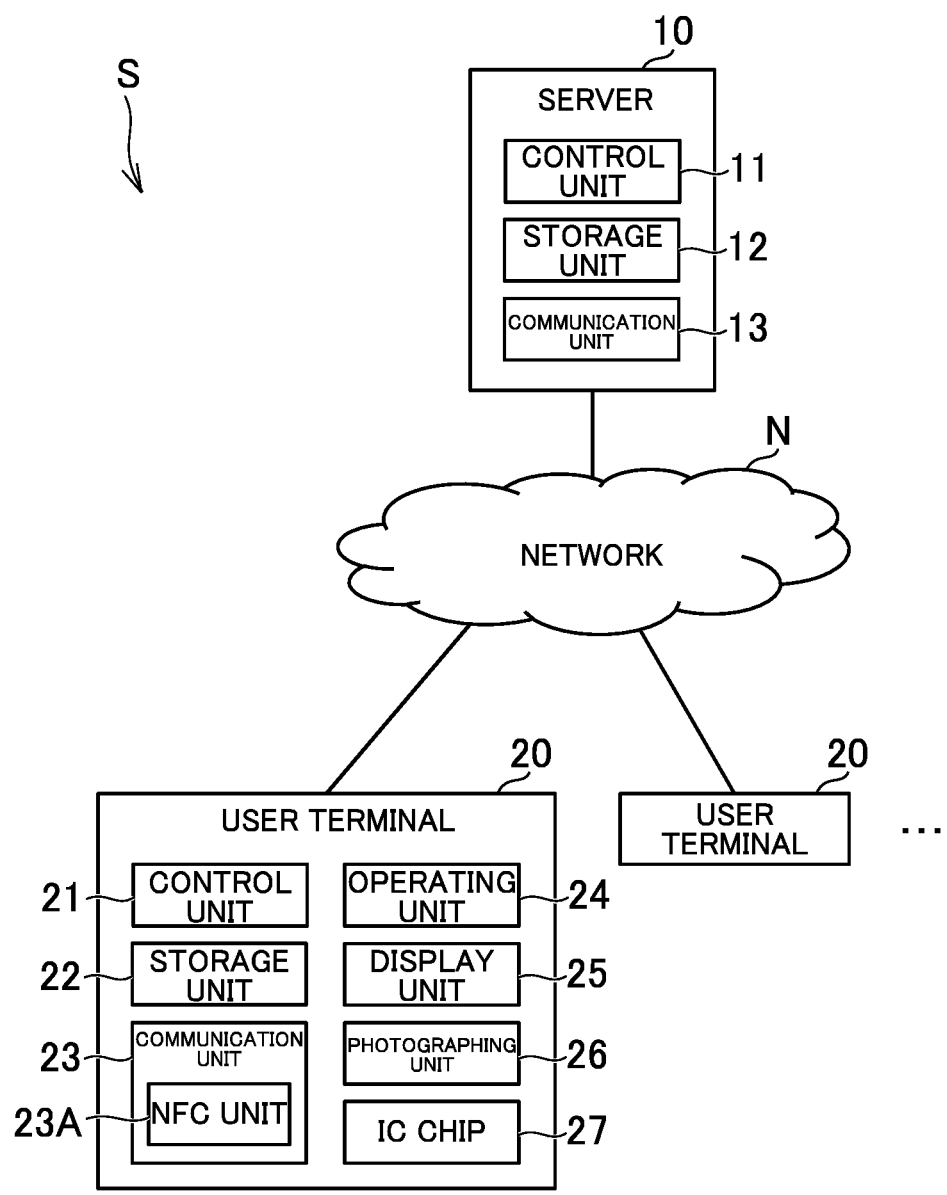
FIG. 1 is a diagram for illustrating an example of an overall configuration of a service providing system.

FIG. 1 is a diagram for illustrating an example of an overall configuration of the service providing system. As illustrated in FIG. 1, a service providing system S includes a server 10 and user terminals 20. Each of the server 10 and the user terminals 20 can be connected to a network N such as the Internet. It suffices that the service providing system S includes at least one computer, and is not limited to the example of FIG. 1. For example, there may be a plurality of servers 10. There may be only one user terminal 20, or there may be three or more user terminals 20.

The server 10 is a server computer. The server 10 includes a control unit 11, a storage unit 12, and a communication unit 13. The control unit 11 includes at least one processor. The storage unit 12 includes a volatile memory such as a RAM, and a nonvolatile memory such as a hard disk drive. The communication unit 13 includes at least one of a communication interface for wired communication or a communication interface for wireless communication.

The user terminal 20 is a computer to be operated by a user. For example, the user terminal 20 is a smartphone, a tablet computer, a wearable terminal, or a personal computer. The user terminal 20 includes a control unit 21, a storage unit 22, a communication unit 23, an operating unit 24, a display unit 25, a photographing unit 26, and an IC chip 27. Physical configurations of the control unit 21 and the storage unit 22 are the same as those of the control unit 11 and the storage unit 12, respectively.

The physical configuration of the communication unit 23 may be the same as that of the communication unit 13, but the communication unit 23 in the first embodiment further includes a near field communication (NFC) unit 23A. The NFC unit 23A includes a communication interface for NFC. For NFC itself, various standards can be used, and international standards, for example, ISO/IEC 18092 or ISO/IEC 21481 can be used. The NFC unit 23A includes hardware including an antenna conforming to the standards, and implements, for example, a reader/writer function, a peer-to-peer function, a card emulation function, a wireless charging function, or a combination thereof.

The operating unit 24 is an input device such as a touch panel. The display unit 25 is a liquid crystal display or an organic EL display. The photographing unit 26 includes at least one camera. The IC chip 27 is a chip that supports NFC. The IC chip 27 may be a chip of any standards, for example, a chip of Felica (trademark) or a chip of a so-called Type A or Type B among the non-contact type standards. The IC chip 27 includes hardware including an antenna conforming to the standards, and stores, for example, information required for a service to be used by a user.

At least one of programs or data stored in the storage units 12 and 22 may be supplied thereto via the network N. Further, at least one of the server 10 or the user terminal 20 may include at least one of a reading unit (e.g., an optical disc drive or a memory card slot) for reading a computer-readable information storage medium, or an input/output unit (e.g., a USB port) for inputting and outputting data to/from an external device. For example, at least one of the program or the data stored in the information storage medium may be supplied through intermediation of at least one of the reading unit or the input/output unit.

1-2. Outline of First Embodiment

The service providing system S according to the first embodiment provides a service that can be logged in to from each of a plurality of user terminals 20. In the first embodiment, an administrative service provided by a public institution such as a government agency is described as an example of the service. Other examples of the service are described in a second embodiment of the present disclosure and modification examples. In the first embodiment, the administrative service is referred to simply as "service." For example, an application (hereinafter referred to simply as "app") of the public institution is installed on the user terminal 20. When the user uses the service for the first time, the user registers to use the service from the app, and is issued with a user ID required for logging in to the service.

Figure 2:
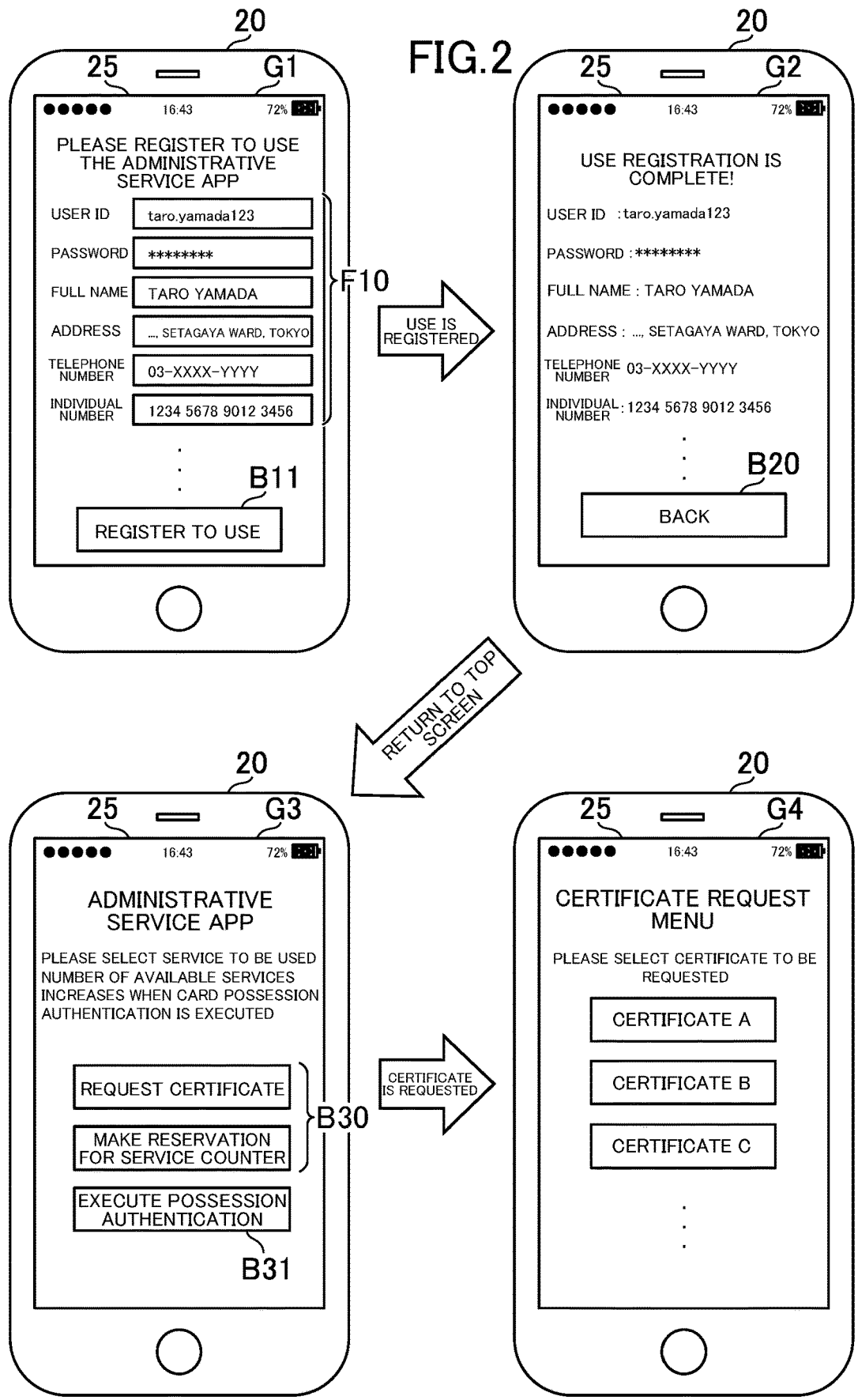
FIG. 2 is a view for illustrating an example of a flow of use registration.

FIG. 2 is a view for illustrating an example of a flow of use registration. As illustrated in FIG. 2, when the user starts the app of the user terminal 20, a registration screen G1 for inputting information required for use registration is displayed on the display unit 25. For example, in an input form F10, the user inputs information including a desired user ID, a password, a full name, an address, a telephone number, and an individual number of the user. The user ID is information that can uniquely identify the user in the service. The individual number is information that can identify the individual written on an individual number card issued by the public institution. In the first embodiment, the individual number card is referred to simply as "card."

When the user selects a button B11, the information input in the input form F10 is transmitted to the server 10, and a completion screen G2 indicating that the use registration is complete is displayed on the display unit 25. When the use registration is complete, the user can use the service from the app. For example, when the user selects a button B20, a top screen G3 of the app is displayed on the display unit 25. For example, on the top screen G3, a list of services usable from the app is displayed. For example, when the user selects one of buttons B30, a use screen G4 for using services such as requesting a certificate or making a reservation for a service counter is displayed on the display unit 25.

A third party may fraudulently obtain the user ID and the password by phishing, for example. In this case, the third party may impersonate another person, log in to the service, and fraudulently use the service. To deal with the problem, in the first embodiment, possession authentication using a card is executed in order to suppress fraudulent use by a third party. Possession authentication is authentication using a possession that is possessed by only the valid person. The possession may be any possession, and is not limited to a card. For example, the possession may be an information storage medium or a piece of paper. The possession is not limited to a tangible object, and may be an intangible object such as electronic data, for example.

The user can freely choose whether or not to execute possession authentication. The users can also use services without executing possession authentication. However, under a state in which possession authentication is not executed, the services available to the user are restricted. When the user executes possession authentication from the user terminal 20 of the user, the types of services available from the user terminal 20 increase. However, even when login is executed from another user terminal 20 by using the user ID of a user who has executed possession authentication, unless possession authentication is executed on that another user terminal 20, the services available from the another user terminal 20 are restricted.

Figure 3:
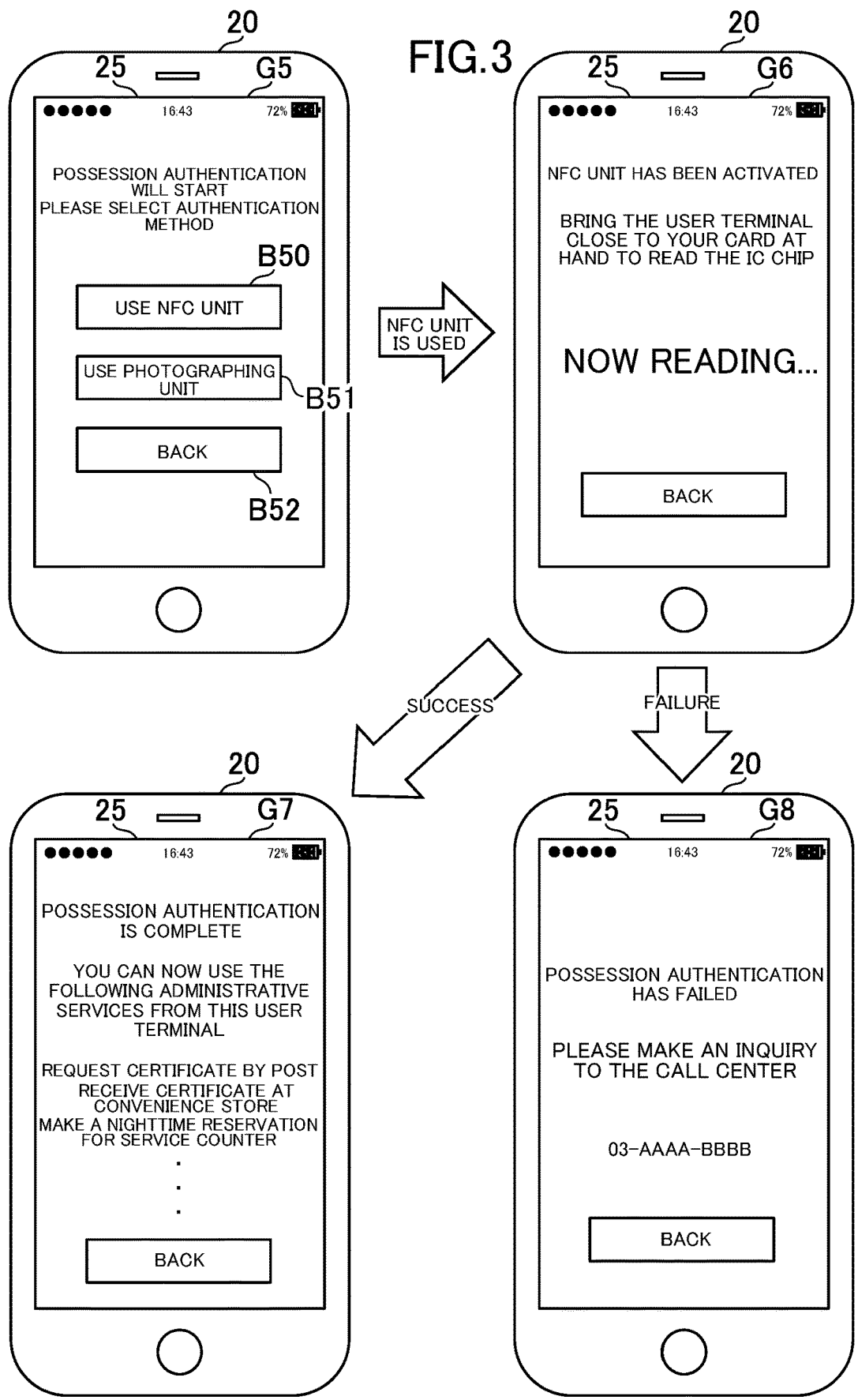
FIG. 3 is a view for illustrating an example of a flow of possession authentication.

FIG. 3 is a view for illustrating an example of a flow of possession authentication. When a button B31 of the top screen G3 of FIG. 2 is selected, a start screen G5 for starting possession authentication is displayed on the display unit 25 as illustrated in FIG. 3. In the first embodiment, as the possession authentication, two types of authentication, that is, NFC authentication utilizing NFC and image authentication utilizing an image are prepared. The NFC authentication is possession authentication to be executed by causing the NFC unit 23A to read information recorded on the IC chip of the card. The image authentication is possession authentication to be executed by causing the photographing unit 26 to photograph the card. The NFC authentication and the image authentication are hereinafter referred to simply as "possession authentication" unless distinguished therebetween.

In FIG. 3, a flow of the NFC authentication is illustrated. When the user selects a button B50 on the start screen G5, the NFC unit 23A is activated, and a reading screen G6 for causing the NFC unit 23A to read the information recorded on the IC chip of the card is displayed on the display unit 25. Possession authentication may be executed at the time of use registration, and in that case, the reading screen G6 may be displayed at the time of use registration. When the reading screen G6 is displayed, the user brings the user terminal 20 closer to the card possessed by the user.

Figure 4:
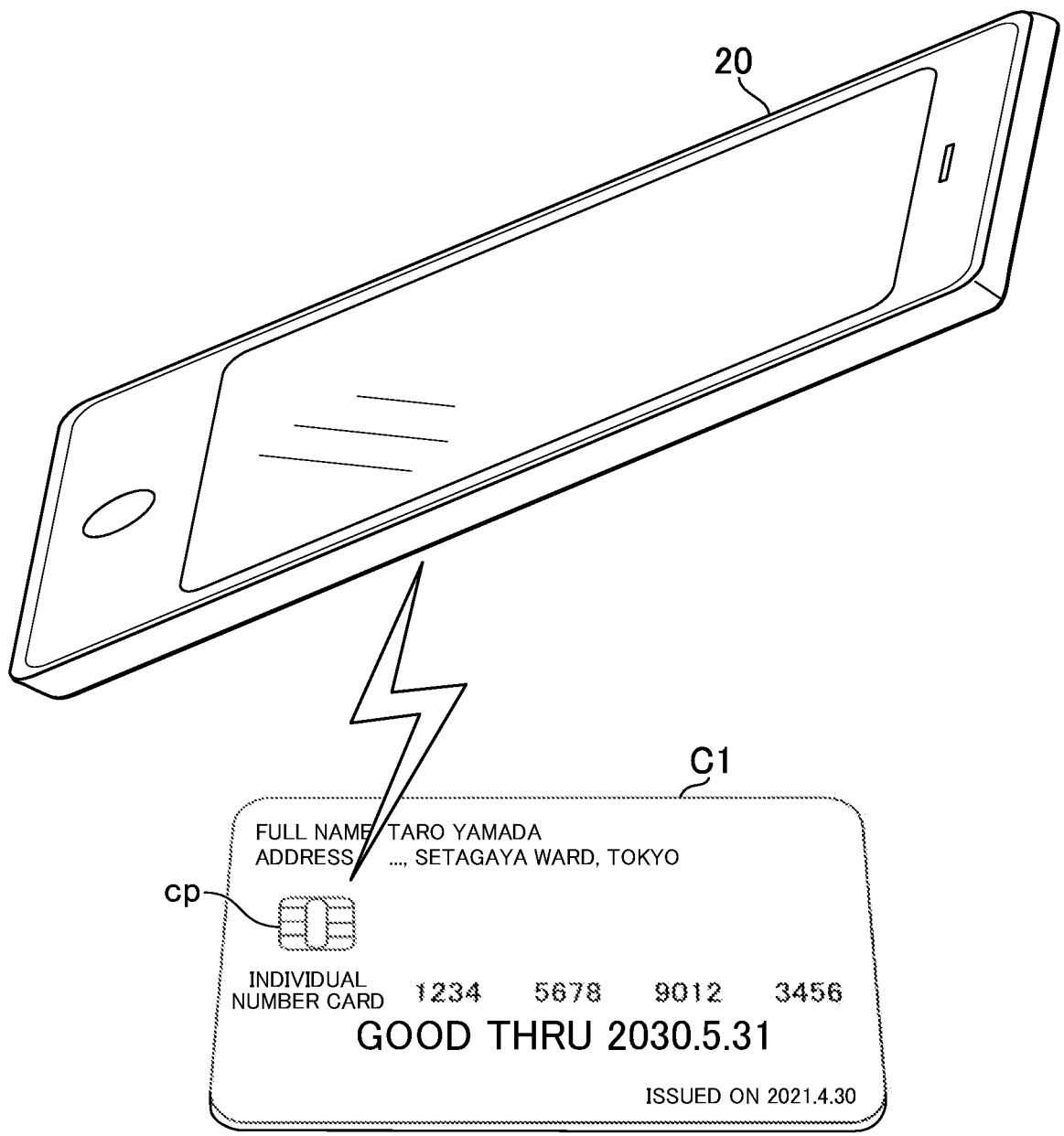
FIG. 4 is a view for illustrating an example of how an IC chip of a card is read by an NFC unit.

FIG. 4 is a view for illustrating an example of how the NFC unit 23A reads the IC chip of the card. A card C1 of FIG. 4 is an imaginary card prepared for the description of the first embodiment. As illustrated in FIG. 4, when the user brings the user terminal 20 closer to an IC chip cp of the card C1, the NFC unit 23A reads the information recorded on the IC chip cp. The NFC unit 23A can read any information in the IC chip cp. In the first embodiment, a case in which the NFC unit 23A reads an individual number recorded on the IC chip cp is described.

The user terminal 20 transmits the individual number read from the IC chip cp to the server 10. The individual number is input from the user terminal 20 to the server 10, and is hence hereinafter referred to as "input individual number." In the first embodiment, input means transmitting some sort of data to the server 10. In the server 10, the individual number to be used as a correct answer is registered in advance at the time of use registration. This individual number is hereinafter referred to as "registered individual number." In the following description, the input individual number and the registered individual number may be referred to simply as "individual number" unless particularly distinguished therebetween.

The server 10 receives the input individual number from the user terminal 20. When the user is the valid owner of the card C1, the input individual number matches the registered individual number of the user who has logged in. When the input individual number matches the registered individual number of the user who has logged in, a success screen G7 indicating that the possession authentication is successful is displayed on the display unit 25 as illustrated in FIG. 3. As illustrated on the success screen G7, there is an increased number of services that are available from the user terminal 20 for which possession authentication has been successful.

Meanwhile, when the input individual number does not match the registered individual number of the user who has logged in, a failure screen G8 indicating that possession authentication has failed is displayed on the display unit 25. In this case, the services available from the user terminal 20 remain restricted. The user returns to the reading screen G6 and executes the reading of the card C1 again or makes an inquiry to a call center. When a third party has fraudulently logged in, the third party does not have the card C1 at hand, and possession authentication is not successful. As a result, the services available from the user terminal 20 of the third party are restricted.

Image authentication is also executed based on a similar flow. In NFC authentication, the input individual number is acquired by using the NFC unit 23A, whereas in image authentication, the input individual number is acquired by using a photographed image obtained by photographing the card C1. For example, when the user selects a button B51 of the start screen G5, the photographing unit 26 is activated. The photographing unit 26 photographs the card C1. The user terminal 20 transmits the photographed image to the server 10. The server 10 receives the photographed image, and executes optical character recognition on the photographed image to acquire the input individual number. The flow after the input individual number is acquired is the same as in NFC authentication.

The optical character recognition may be executed by the user terminal 20. Moreover, the method of acquiring the input individual number from the photographed image is not limited to optical character recognition, and as the method itself, various known methods may be applied. For example, when a code including the input individual number (for example, a bar code or a two-dimensional code) is formed on the card C1, the input individual number may be acquired by using the code photographed in the photographed image. The processing for acquiring the input individual number from the code may be executed by the server 10 or executed by the user terminal 20.

As described above, in the service providing system S, there are more services available from a user terminal 20 for which possession authentication has been successful than the services available from a user terminal 20 for which possession authentication has not been successful. Even when a third party fraudulently obtains a user ID and a password and fraudulently logs in, the third party does not possess the card C1 and possession authentication is not successful, and therefore the available services are restricted. For this reason, fraudulent use of the services by a third party is suppressed, and the security of the services is enhanced. The first embodiment is described below in detail.

1-3. Functions Implemented in First Embodiment

Figure 5:
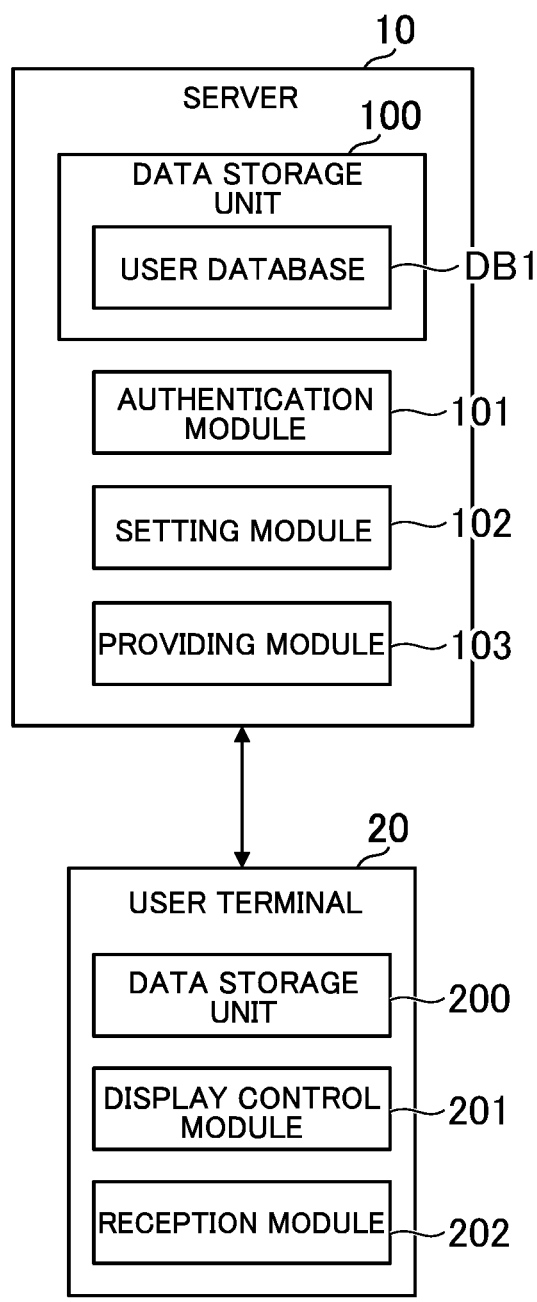
FIG. 5 is a functional block diagram for illustrating an example of functions implemented by a service providing system according to a first embodiment of the present disclosure.

FIG. 5 is a functional block diagram for illustrating an example of functions implemented by the service providing system S according to the first embodiment. In this case, the functions implemented on each of the server 10 and the user terminal 20 are described.

[1-3-1. Functions Implemented on Server]

As illustrated in FIG. 5, on the server 10, a data storage unit 100, an authentication module 101, a setting module 102, and a providing module 103 are implemented. The data storage unit 100 is implemented mainly by the storage unit 12. Each of the authentication module 101, the setting module 102, and the providing module 103 is mainly implemented by the control unit 11.

[Data Storage Unit]

The data storage unit 100 stores data required for providing the service. For example, the data storage unit 100 stores a user database DB1.

FIG. 6 is a table for showing a data storage example of the user database DB1. As shown in FIG. 6, the user database DB1 is a database in which information relating to users who have completed use registration is stored. For example, the user database DB1 stores a user ID, a password, a full name, an address, a telephone number, a registered individual number, a terminal ID, a possession authentication flag, and a setting relating to services. This setting is hereinafter referred to as "usage setting."

For example, when the user has performed a use registration, a new record is created in the user database DB1. The record stores the user ID, password, full name, address, telephone number, and registered individual number that have been designated at the time of use registration. In the first embodiment, the registered individual number is not changeable after the use registration. Thus, even when a third party fraudulently logs in, the third party is not able to change the registered individual number by themselves.

The terminal ID is information that can identify the user terminal 20. In the first embodiment, a case in which the server 10 issues the terminal ID is described. The terminal ID is issued based on a predetermined rule. The server 10 issues the terminal ID so as not to duplicate another terminal ID. An expiration date may be set for the terminal ID. The terminal ID can be issued at any timing. For example, the terminal ID is issued when the app is started, when the expiration date set for the terminal ID is reached, or an operation for updating the terminal ID is performed.

The user terminal 20 can be identified based on any information other than the terminal ID. For example, other than the terminal ID, the user terminal 20 can be identified based on the IP address, information stored in a cookie, an ID stored in a SIM card, an ID stored in the IC chip 27, or the individual identification information on the user terminal 20. It suffices that the information that can identify the user terminal 20 in some way is stored in the user database DB1.

The terminal ID associated with the user ID is the terminal ID of the user terminal 20 that has been logged in to from the user ID. Thus, when a certain user who is the valid owner of a certain user ID logs in from a new user terminal 20, the terminal ID of the new user terminal 20 is associated with the user ID. Even when a third party fraudulently logs in from this user ID, the terminal ID of the user terminal 20 of the third party is associated with the user ID.

The terminal ID is associated with the possession authentication flag and the usage setting. In the first embodiment, there is a pair of the possession authentication flag and the usage setting for each combination of the user ID and the terminal ID. In the example of FIG. 6, a user ID "taro.yamada123" has ever been used for login from two user terminals 20, and there are two pairs of the possession authentication flag and the usage setting. A user ID "hanako.suzuki999" has ever been used for login from three user terminals 20, and there are three pairs of the possession authentication flag and the usage setting. A user ID "kimura9876" has ever been used for login from only one user terminal 20, and there is only one pair of the possession authentication flag and the usage setting.

The possession authentication flag is information indicating whether or not possession authentication has been executed. For example, when the possession authentication flag is "1", this indicates that NFC authentication has been executed. When the possession authentication flag is "2", this indicates that image authentication has been executed. When the possession authentication flag is "0", this indicates that possession authentication has not been executed. In the first embodiment, a case in which possession authentication is not executed at the time of use registration is described, and therefore the initial value of the possession authentication flag is "0". When possession authentication is executed after use registration, the possession authentication flag changes to "1" or "2". In a case in which possession authentication can be executed at the time of use registration, when the user executes possession authentication at the time of use registration, the initial value of the possession authentication flag becomes "1" or "2".

The usage setting is a setting performed by the setting module 102 described later. In the first embodiment, as the usage setting, the types of services that are usable from the app are shown. The usage setting when the possession authentication flag is "1" or "2" has more services that can be used than those of the usage setting when the possession authentication flag is "0". It is assumed that the relationship between whether or not possession authentication has been executed and the usage setting (that is, the relationship between the possession authentication flag and the usage setting) is defined in advance in the data storage unit 100. In the example of FIG. 6, the usage setting when the possession authentication flag is "1" or "2" is a setting in which all services can be used. The usage setting when the possession authentication flag is "0" is a setting in which only a part of the services can be used.

[Authentication Module]

The authentication module 101 can execute predetermined authentication for each user terminal 20 under a state in which a service has been logged in to from the user terminal 20. In the first embodiment, a case in which the authentication is possession authentication for confirming whether or not a predetermined card C1 is possessed by using the user terminal 20 is taken as an example. Accordingly, possession authentication as used herein can be read as "predetermined authentication." That is, NFC authentication or image authentication as used herein can be read as "predetermined authentication."

The predetermined authentication is authentication that can be executed from the user terminal 20 that has logged in. It suffices that the predetermined authentication is different from the authentication at login. The predetermined authentication is not limited to possession authentication using the card C1. Various authentication methods can be used for the predetermined authentication. For example, the predetermined authentication may be possession authentication for confirming a possession other than the card C1. The possession may be anything that can be used to confirm the identity of the user. For example, the possession may be an identification certificate, for example a passport, other than a card, an information storage medium in which some sort of authentication information is recorded, or a piece of paper on which some sort of authentication information is formed. For example, the possession may be an electronic object such as a code including authentication information.

The predetermined authentication is not limited to possession authentication. For example, the predetermined authentication may be knowledge authentication, such as password authentication, passcode authentication, personal identification number authentication, or countersign authentication. When the predetermined authentication is password authentication, a password different from the password used at login is used. As another example, the predetermined authentication may be biometric authentication, such as face authentication, fingerprint authentication, or iris authentication. In the first embodiment, a case in which the predetermined authentication is more secure than the authentication at login is described, but the authentication at login may be more secure than the predetermined authentication. The authentication at login is not limited to password authentication, and may be any authentication method.

The card C1 used in the possession authentication in the first embodiment includes an input individual number to be used in the possession authentication. For example, the input individual number is electronically recorded on the IC chip cp of the card C1. In the first embodiment, the input individual number is also formed on the surface of the card C1. The registered individual number, which is to be used as the correct t answer in the possession authentication, is registered in the user database DB1. Each of the input individual number and the registered individual number is an example of the authentication information used at the time of authentication.

When another authentication method is used as the predetermined authentication, it suffices that authentication information corresponding to the authentication method is used. For example, when knowledge authentication is used, the authentication information may be a password, a passcode, a personal identification number, or a countersign. When biometric authentication is used, each piece of the authentication information may be a facial photograph, a facial feature amount, a fingerprint pattern, or an iris pattern.

For example, when the possession authentication is executed by using NFC authentication, the authentication module 101 acquires the input individual number of the card C1 acquired by using the NFC unit 23A from the user terminal 20. The authentication module 101 refers to the user database DB1, and determines whether or not the input individual number acquired from the user terminal 20 and the registered individual number associated with the user who has logged in match. When those numbers match, possession authentication is successful. When those numbers do not match, possession authentication fails.

For example, when the possession authentication is executed by using image authentication, the authentication module 101 acquires a photographed image of the card C1 from the user terminal 20. The authentication module 101 uses optical character recognition to acquire the input individual number from the photographed image. The flow of the possession authentication after the input individual number is acquired is the same as for NFC authentication. In the first embodiment, a case in which the input individual number is printed on the surface of the card C1 is described, but the input individual number may be formed as unevenness embossed on the surface of the card C1. It suffices that the input individual number is formed on at least one of the front surface or the back surface of the card C1.

The service in the first embodiment can be logged in from each of the plurality of user terminals 20 by using the same user ID. The authentication module 101 can execute, for each user terminal 20, possession authentication under a state in which the service has been logged in to from the user terminal 20 through use of the user ID. For example, it is assumed that the user having the user ID "taro.yamada123" of FIG. 6 is using two user terminals 20. Those two user terminals 20 are referred to as "first user terminal 20A" and "second user terminal 20B."

The authentication module 101 can execute possession authentication from the first user terminal 20A under a state in which the service has been logged in to through use of the user ID "taro.yamada123." The authentication module 101 can execute possession authentication from the second user terminal 20B under a state in which the service has been logged in to through use of the same user ID "taro.yamada123." Similarly, when one user uses three or more user terminals 20, the authentication module 101 can execute possession authentication for each user terminal 20. As described above, whether or not to execute the possession authentication is up to the user, and hence it suffices that the authentication module 101 is in a state in which the possession authentication can be executed. That is, the authentication module 101 is not required to execute the possession authentication for all the user terminals 20.

[Setting Module]

The setting module 102 performs the usage setting for each user terminal 20 based on whether or not the possession authentication has been executed from the user terminal 20.

The usage setting is a setting of a range of use of a service. The usage setting can also be said to be a setting of a method of using a service. For example, the setting of types of services available to the user corresponds to the usage setting. For example, the setting of a time during which the user can use a service corresponds to the usage setting. It suffices that the usage setting is a setting that corresponds to a service. The usage setting in an application example of another service is described later.

Whether or not the possession authentication has been executed refers to whether or not the possession authentication is successful. Performing the usage setting for each user terminal 20 refers to performing the usage setting so that the user terminal 20 and the usage setting have a one-to-one correspondence (that is, the terminal ID and the usage setting have a one-to-one correspondence). The setting module 102 causes the usage setting of the user terminal 20 for which the possession authentication has been executed and the usage setting of the user terminal 20 for which the possession authentication has not been executed to differ from each other. It is assumed that the usage setting to be performed when the possession authentication has been executed and the usage setting to be performed when the possession authentication has not been executed are each defined in advance in the data storage unit 100.

For example, when the possession authentication has not been executed from a certain user terminal 20, the setting module 102 performs the usage setting for this user terminal 20 so that the use of the service from the certain user terminal 20 is restricted. When the possession authentication has been executed from a certain user terminal 20, the setting module 102 performs the usage setting for this user terminal 20 so that the restriction on the use of the service from this user terminal 20 is lifted. In addition, for example, depending on the service, a third party may attempt to perform the usage setting without permission, and hence when the possession authentication has not been executed from a certain user terminal 20, the setting module 102 restricts the change of the usage setting from the certain user terminal 20. When the possession authentication has been executed from a certain user terminal 20, the setting module 102 permits the change of the usage setting from the certain user terminal 20.

In the first embodiment, the types of available services are restricted before the possession authentication has been executed. The user can only use some types of services, and cannot use other types of services. When the possession authentication has been executed from a certain user terminal 20, the setting module 102 performs the usage setting so that the other types of services can be used from the certain user terminal 20. The setting module 102 stores the usage setting in the user database DB1 in association with the terminal ID of a certain user terminal 20, to thereby perform the usage setting for this user terminal 20.

In the first embodiment, the setting module 102 performs the usage setting for each combination of the user terminal 20 and the user ID based on whether or not the possession authentication has been executed under a state in which the service has been logged in to from the user terminal 20 through use of the user ID. The combination as used herein means a set or a pair of a plurality of pieces of information. The usage setting and the combination of the user terminal 20 and the user ID (that is, combination of the terminal ID and the user ID) have a one-to-one correspondence. When the login is performed from the same user terminal 20 through use of a plurality of user IDs, the user terminal 20 and the usage setting have a one-to-many correspondence.

When the login is performed from a plurality of user terminals 20 through use of the same user ID, the user terminal 20 and the usage setting have a many-to-one correspondence.

[Providing Module]

The providing module 103 provides a service to each user terminal 20 based on the usage setting of the user terminal 20. Providing a service refers to transmitting data relating to the service to the user terminal 20, executing processing relating to the service on the server 10 side, or both thereof. Providing a service can be said to be providing the service to the user terminal 20, or can also be said to be providing the service to the user of the user terminal 20. In the first embodiment, the providing module 103 provides a service for each combination of the user terminal 20 and the user ID based on the usage setting of the combination.

For example, the providing module 103 refers to the user database DB1 to acquire the usage setting associated with the combination of the user terminal 20 that has logged in and the user ID (that is, combination of the terminal ID and the user ID). The providing module 103 generates display data of the top screen G3 on which the type of service indicated by the usage setting can be selected. The display data is data for displaying some screen on the user terminal 20. For example, HTML data or data on an image included in the screen corresponds to the display data. The providing module 103 provides a service by transmitting the generated display data to the user terminal 20. The providing module 103 also provides a service of a type selected from the top screen G3.

[1-3-2. Functions Implemented on User Terminal]

As illustrated in FIG. 5, on the user terminal 20, a data storage unit 200, a display control module 201, and a reception module 202 are implemented. The data storage unit 200 is implemented mainly by the storage unit 22. Each of the display control module 201 and the reception module 202 is implemented mainly by the control unit 21. The data storage unit 200 stores data required for processing described in the first embodiment. For example, the data storage unit 200 stores an app. The display control module 201 causes the display unit 25 to display each of the screens described with reference to FIG. 2 and FIG. 3 based on the app. The reception module 202 receives the user's operation on each screen. The user terminal 20 transmits the content of the operation of the user to the server 10.

1-4. Processing to be Executed in First Embodiment

Figure 7:
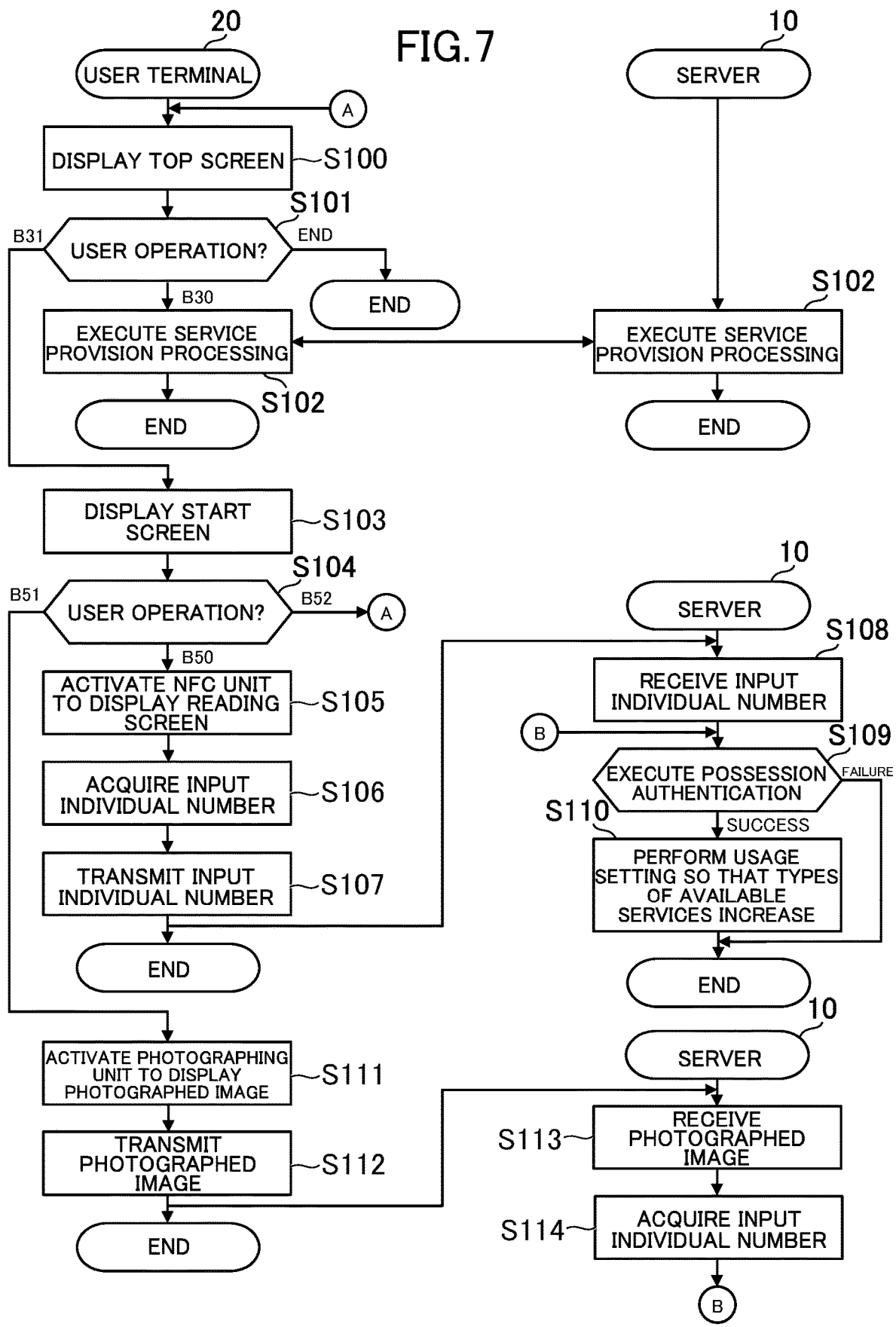
FIG. 7 is a flow chart for illustrating an example of processing to be executed in the first embodiment.

FIG. 7 is a flow chart for illustrating an example of processing to be executed in the first embodiment. The processing illustrated in FIG. 7 is executed by the control units 11 and 21 operating in accordance with the programs stored in the storage units 12 and 22, respectively. This processing is an example of processing to be executed by the functional blocks illustrated in FIG. 5. It is assumed that, before the execution of this processing, the use registration by the user is complete. It is also assumed that the user terminal 20 stores the terminal ID issued by the server 10 in advance.

As illustrated in FIG. 7, the user terminal 20 activates the app based on the operation of the user, and displays the top screen G3 on the display unit 25 (Step S100). When the app is started, login may be executed between the server 10 and the user terminal 20. At login, input of the user ID and the password may be required, or information indicating that the user has logged in in the past may be stored in the user terminal 20, and that information may be used for login. The server 10 may also generate, before login is successful and the top screen G3 is displayed, the display data of such a top screen G3 that the buttons B30 of unusable services are not selectable based on the usage setting associated with the terminal ID of the user terminal 20, and transmit the generated display data to the user terminal 20.

The user terminal 20 identifies an operation of the user based on a detection signal obtained by the operating unit 24 (Step S101). In Step S101, any one of the button B30 for using an administrative service and the button B31 for executing possession authentication is selected. When the user terminal 20 has already executed possession authentication, the button B31 may not be selectable. When the user performs an operation for ending the app or an operation for shifting the app to the background ("end" in Step S101), this process ends.

When one of the buttons B30 is selected in Step S101 ("B30" in Step S101), service provision processing for providing the service is executed between the server 10 and the user terminal 20 (Step S102), and this process ends. In Step S102, the server 10 refers to the user database DB1, and acquires the usage setting associated with the user ID of the logged-in user and the terminal ID of the user terminal 20. The server 10 provides the service based on the usage setting. The server 10 receives the content of the operation of the user from the user terminal 20, and executes the processing corresponding to the operation content.

When the button B31 is selected in Step S101 ("B31" in Step S101), the user terminal 20 displays the start screen G5 on the display unit 25 (Step S103). The user terminal 20 identifies an operation of the user based on a detection signal obtained by the operating unit 24 (Step S104). In Step S104, any one of the buttons B50 and B51 or a button B52 is selected. When the button B52 is selected ("B52" in Step S104), the process returns to Step S100.

When the button B50 is selected ("B50" in Step S104), the user terminal 20 activates the NFC unit 23A to display the reading screen G6 on the display unit 25 (Step S105). The user terminal 20 uses the NFC unit 23A to acquire the input individual number from the IC chip cp of the card C1 (Step S106), and transmits the input individual number acquired from the card C1 to the server 10 (Step S107).

When the server 10 receives the input individual number from the user terminal 20 (Step S108), the server 10 executes the possession authentication (Step S109). In Step S109, the server 10 determines whether or not the input individual number received from the user terminal 20 and the registered individual number registered in the user database DB1 in association with the user ID of the user who has logged in match. When those numbers match, the possession authentication is successful. When those numbers do not match, the possession authentication fails.

When the possession authentication is successful ("success" in Step S109), the server 10 performs the usage setting so that the types of available services increase (Step S110), and this process ends. In Step S110, the server 10 updates, in the user database DB1, the usage setting associated with the user ID of the user who has logged in and the terminal ID of the user terminal 20 that has logged in. When the possession authentication fails ("failure" in Step S109), a predetermined error message is displayed, and this process ends. In this case, the usage setting is not updated.

When the button B51 is selected in Step S104 ("B51" in Step S104), the user terminal 20 activates the photographing unit 26 to display the photographed image being photographed on the display unit 25 (Step S111). When the user performs an operation for determining the photographed image, the user terminal 20 transmits the photographed image to the server 10 (Step S112). When the server 10 receives the photographed image from the user terminal 20 (Step S113), the server 10 uses optical character recognition to acquire the input individual number from the photographed image (Step S114), and the process advances to the processing step of Step S109. In this case as well, when the possession authentication is successful, the usage setting is performed so that the types of available services increase by the processing step of Step S110.

According to the service providing system S of the first embodiment, the usage setting for the service is performed for each user terminal 20 based on whether or not the possession authentication has been executed under a state in which the service has been logged in to from the user terminal 20, and a service is provided to each user terminal 20 based on the usage setting of the user terminal 20. For example, even when a third party illegally obtains a user ID and a password and illegally logs in from his or her own user terminal 20, he or she does not possess the card C1, and thus cannot execute the possession authentication from this user terminal 20. Accordingly, the usage setting of the service is performed based on whether or not the possession authentication has been executed under the state in which the service has been logged in to from the user terminal, to thereby suppress fraudulent use by a third party and enhance the security of the service. When the user who possesses the card C1 executes possession authentication from his or her own user terminal 20, the restriction on the services that can be used from the user terminal 20 can be lifted, and hence the convenience is enhanced.

The service providing system S also performs the usage setting for each combination of the user terminal 20 and the user ID, and provides a service for each combination of the user terminal 20 and the user ID based on the usage setting of the combination. For example, in a service to which users can log in from each of a plurality of user terminals 20 through use of the same user ID, a third party who has illegally obtained a user ID and a password can illegally log in from his or her own user terminal 20. However, the user terminal 20 of the third party cannot execute the possession authentication, and hence fraudulent use by a third party is suppressed, thereby enhancing the security in the service. Assuming that the user who possesses the card C1 uses each of the plurality of user terminals 20, when the possession authentication is executed from each of the plurality of user terminals 20, the restriction on the services that can be used from each of the plurality of user terminals 20 can be lifted, and hence the convenience is enhanced.

Further, when the service providing system S uses the user terminal 20 to execute the possession authentication for confirming whether or not a user possesses the card C1, it is accurately determined whether or not this user is a valid user, thereby effectively enhancing the security.

2. Second Embodiment

Next, the service providing system S according to the second embodiment is described. In the second embodiment, a case in which the service providing system S is applied to an electronic payment service is taken as an example. The electronic payment service is a service which executes electronic payment by using predetermined payment means. The user can use various payment means. For example, the payment means may be a credit card, a debit card, electronic money, electronic cash, points, a bank account, a wallet, or a virtual currency. Electronic payment using a code, such as a barcode or a two-dimensional code, is also sometimes referred to as "code payment," and therefore the code may correspond to payment means. The electronic payment service is hereinafter simply referred to as "service."

The service providing system S provides a service using a card of the user. In the second embodiment, a credit card is taken as an example of the card. The card may be any card that can be used for electronic payment, and is not limited to a credit card. For example, the card may be a debit card, a loyalty card, an electronic money card, a cash card, a transportation card, or any other card. The card is not limited to an IC card, and may be a card that does not include an IC chip. For example, the card may be a magnetic card. In the second embodiment, description of points that are the same as in the first embodiment is omitted.

2-1. Overall Configuration of Service Providing System

Figure 8:
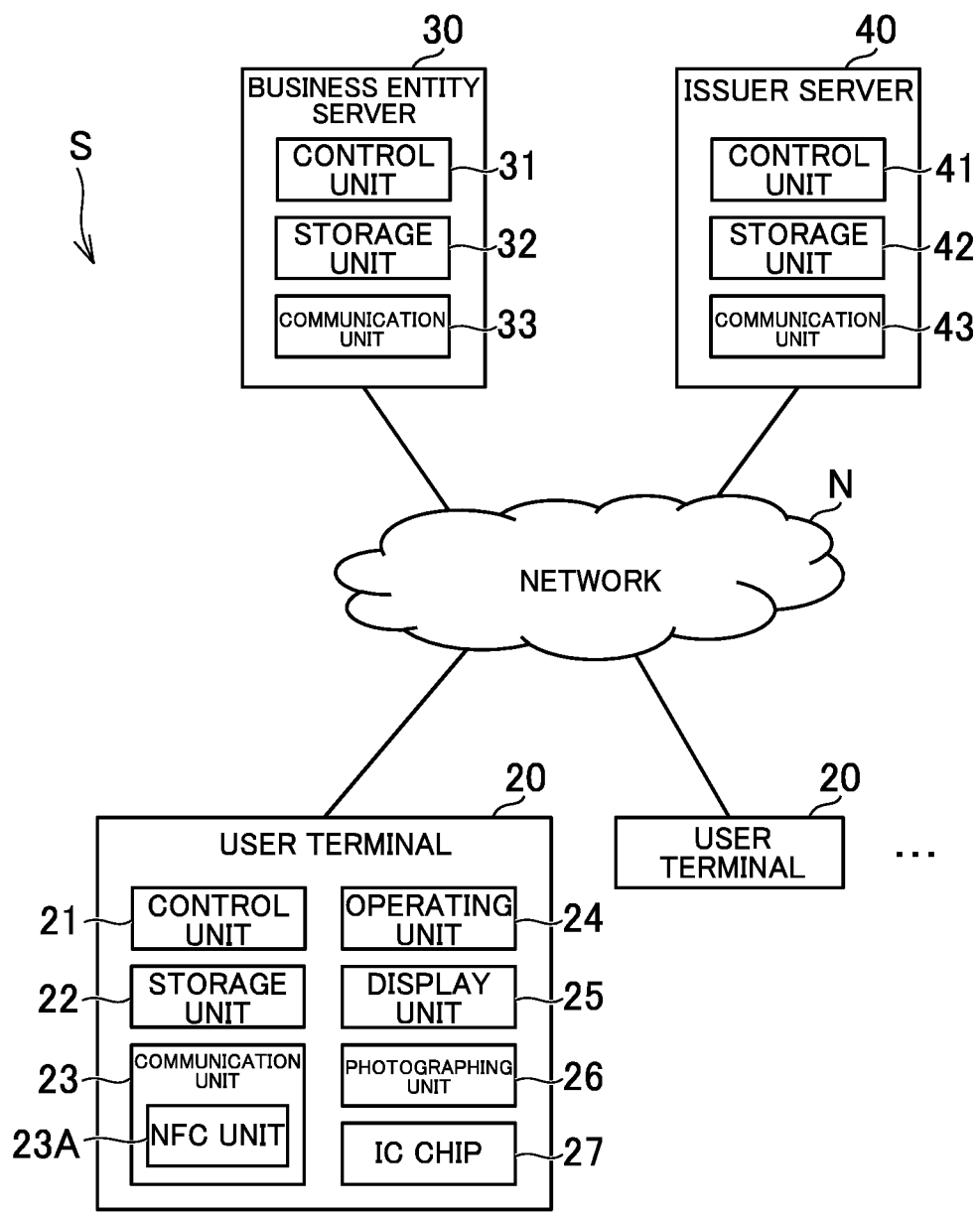
FIG. 8 is a diagram for illustrating an example of an overall configuration of a service providing system according to a second embodiment of the present disclosure.

FIG. 8 is a diagram for illustrating an example of an overall configuration of the service providing system S of the second embodiment. As illustrated in FIG. 8, the service providing system S of the second embodiment includes user terminals 20, a business entity server 30, and an issuer server 40. It suffices that the service providing system S includes at least one computer, and is not limited to the example of FIG. 8. Each of the user terminals 20, the business entity server 30, and the issuer server 40 is connected to the network N. The user terminal 20 is the same as in the first embodiment.

The business entity server 30 is a server computer of a business entity providing a service. The business entity server 30 includes a control unit 31, a storage unit 32, and a communication unit 33. Physical configurations of the control unit 31, the storage unit 32, and the communication unit 33 are the same as those of the control unit 11, the storage unit 12, and the communication unit 13, respectively. The issuer server 40 is a server computer of an issuer which has issued the credit card. The issuer may be the same as the business entity, but in the second embodiment, a case in which the issuer is different from the business entity is described. The issuer and the business entity may be group companies that can cooperate with each other. The issuer server 40 includes a control unit 41, a storage unit 42, and a communication unit 43. Physical configurations of the control unit 41, the storage unit 42, and the communication unit 43 are the same as those of the control unit 11, the storage unit 12, and the communication unit 13, respectively.

At least one of programs or data stored in the storage units 32 and 42 may be supplied thereto via the network N. Further, at least one of the business entity server 30 or the issuer server 40 may include at least one of a reading unit (e.g., an optical disc drive or a memory card slot) for reading a computer-readable information storage medium, or an input/output unit (e.g., a USB port) for inputting and outputting data to/from an external device. For example, at least one of the program or the data stored in the information storage medium may be supplied through intermediation of at least one of the reading unit or the input/output unit.

2-2. Outline of Second Embodiment

In the second embodiment, an application for electronic payment (hereinafter referred to simply as "app") is installed on the user terminal 20. The user has completed use registration in advance, and can log in to the service by using a user ID and a password. The user can use any payment means from the app. In the second embodiment, a case in which the user uses a credit card and electronic cash from the app is taken as an example. The credit card is hereinafter simply referred to as "card."

Figure 9:
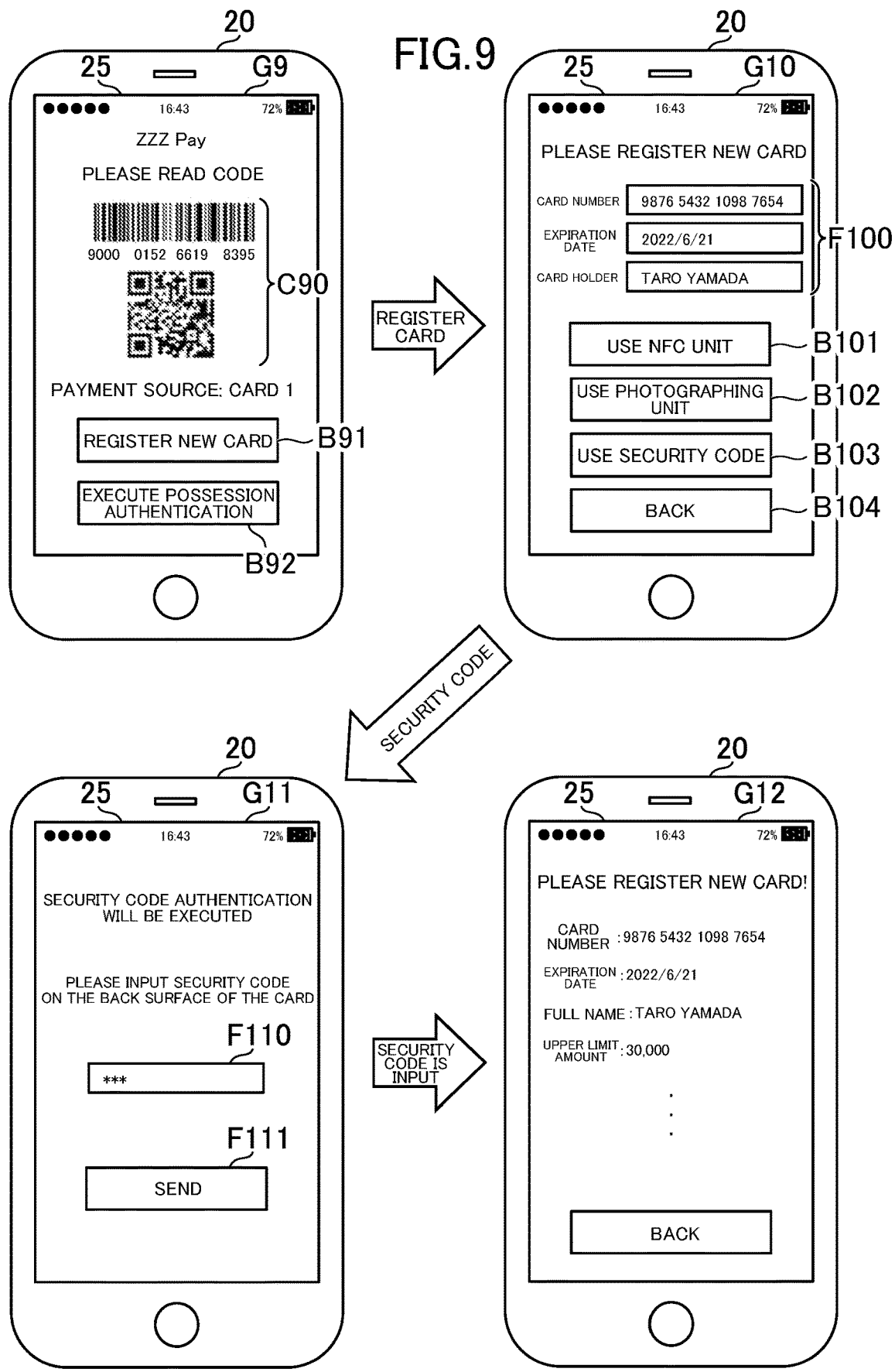
FIG. 9 is a view for illustrating an example of screens to be displayed on a user terminal in the second embodiment.

FIG. 9 is a view for illustrating an example of screens displayed on the user terminal 20 in the second embodiment. As illustrated in FIG. 9, when the user operates the user terminal 20 to start the app, a top screen G9 of the app is displayed on the display unit 25. A code C90 for electronic payment is displayed on the top screen G9. For example, when the code C90 is read by a POS terminal or a code reader of a shop, payment processing is executed based on the payment means of a payment source set in advance. A known method can be used for the payment processing itself using the code C90.

In the example of FIG. 9, a card registered under the name "card 1" is set as the payment source. When the code C90 is read under this state, payment processing using this card is executed. The user can also use the card set as the payment source to add electronic cash usable in the app. Electronic cash is online electronic money. When the user changes the payment source to electronic cash and the code C90 is read, payment processing using the electronic cash is executed.

In the second embodiment, a new card can be registered from the top screen G9. For example, when the user selects a button B91, a registration screen G10 for registering a new card is displayed on the display unit 25. The user inputs card information, for example, the card number, expiration date, and card holder, from an input form F100. In the second embodiment, a plurality of authentication methods, for example, NFC authentication, image authentication, and security code authentication, can be used as the authentication at the time of card registration. The user can select buttons B101 to B103 and select any of the authentication methods. The authentication at the time of credit card registration may be another authentication method. For example, an authentication method called "3D Secure" may be used.

NFC authentication is the same as in the first embodiment, and is executed by reading the card by using the NFC unit 23A. Image authentication is also the same as in the first embodiment, and is executed by photographing the card by the photographing unit 26. Security code authentication is executed by inputting a security code formed on the back surface of the card from the operating unit 24. As a general rule, the security code is information that is known only when the card is possessed. Thus, in the second embodiment, not only NFC authentication and image authentication but also security code authentication is described as an example of possession authentication.

In FIG. 9, the flow of security code authentication is illustrated. For example, when the user selects the button B103, an authentication screen G11 for executing security code authentication is displayed on the display unit 25. When the user inputs the security code in an input form F110 and selects a button B111, the user terminal 20 transmits the card information input in the input form F100 and the security code input in the input form F110 to the business entity server 30. The card information and the security code are hereinafter referred to as "input card information" and "input security code," respectively.

The business entity server 30 receives the input card information and the input security code from the user terminal 20, transfers the input card information and the input security code to the issuer server 40, and the issuer server 40 executes security code authentication. The card information and the security code registered in advance in the issuer server 40 are hereinafter referred to as "registered card information" and "registered security code," respectively. Security code authentication is successful when the same combination of registered card information and registration security code as the combination of input card information and input security code exists in the issuer server 40.

When security code authentication is executed, the registration of the card for which the input card information is input from the input form F100 is complete. On the user terminal 20, a completion screen G12 indicating that the card registration is complete is displayed on the display unit 25. The user can then set the registered card as the payment source.

In the second embodiment, an upper limit amount that is usable from the app is set for each card. The upper limit amount may mean the upper limit amount of the card itself (so-called usage limit or limit amount), but in the second embodiment, the upper limit amount is not the upper limit amount of the card itself, but is the upper limit amount in the app. For example, the upper limit amount is the total amount that is usable from the app in a predetermined period (for example, one week or one month). The upper limit amount may be the upper limit amount per payment process.

The upper limit amount of the card depends on the authentication method of possession authentication executed at the registration of the card. As the security of the possession authentication executed at the time of card registration becomes higher, the upper limit amount of the card becomes higher. For example, the security code may be leaked due to phishing, and therefore security code authentication has the lowest security. Meanwhile, NFC authentication or image authentication is in principle not successful without possession of a physical card C, and therefore has security higher than that of security code authentication.

In the example of FIG. 9, security code authentication, which has the lowest security, is executed, and therefore the upper limit amount is the lowest, namely, 30,000 yen. For example, when the user selects the button B101 or the button B102 at the time of card registration and executes NFC authentication or image authentication, the upper limit amount becomes 100,000 yen, which is higher than 30,000 yen. After registering the card, the user can also increase the upper limit amount by executing possession authentication, which is a highly secure authentication method.

Figure 10:
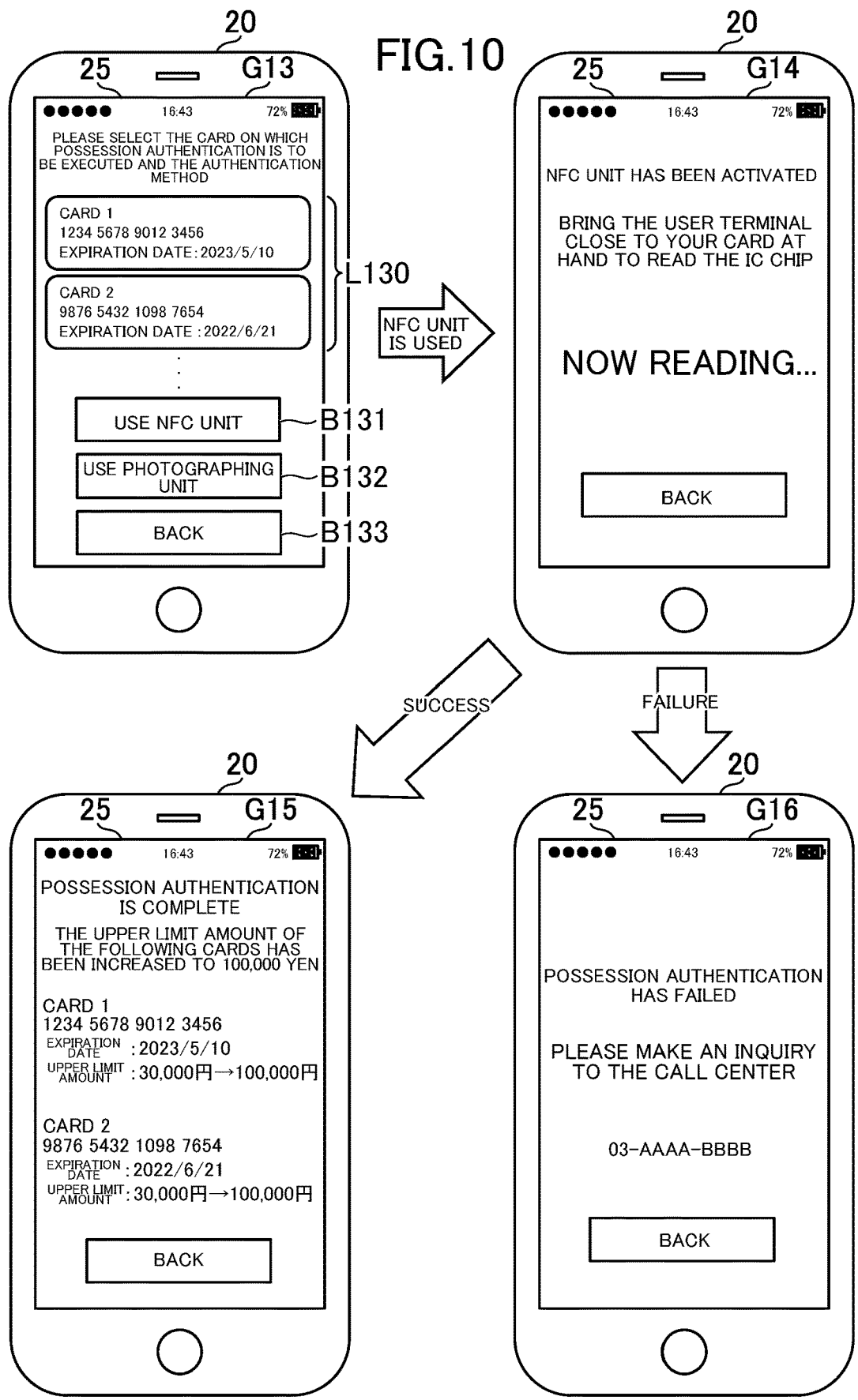
FIG. 10 is a view for illustrating an example of a flow of increasing an upper limit amount after registration of the card.

FIG. 10 is a view for illustrating an example of a flow for increasing the upper limit amount after the registration of the card. When a button B92 of the top screen G9 of FIG. 9 is selected, as illustrated in FIG. 10, a selection screen G13 for selecting the card on which possession authentication is to be executed displayed on the display unit 25. A list L130 of registered cards is displayed on the selection screen G13. The user selects the card on which possession authentication is to be executed from the list L130.

The user can select any authentication method. For example, when the user selects a card on which security code authentication has been executed, the user can select NFC authentication or image authentication, which have higher security than that of security code authentication. When the user selects a button B131, a reading screen G14 similar to the reading screen G6 is displayed on the display unit 25. When the reading screen G14 is displayed, the user brings the user terminal 20 closer to the card possessed by the user.

Figure 11:
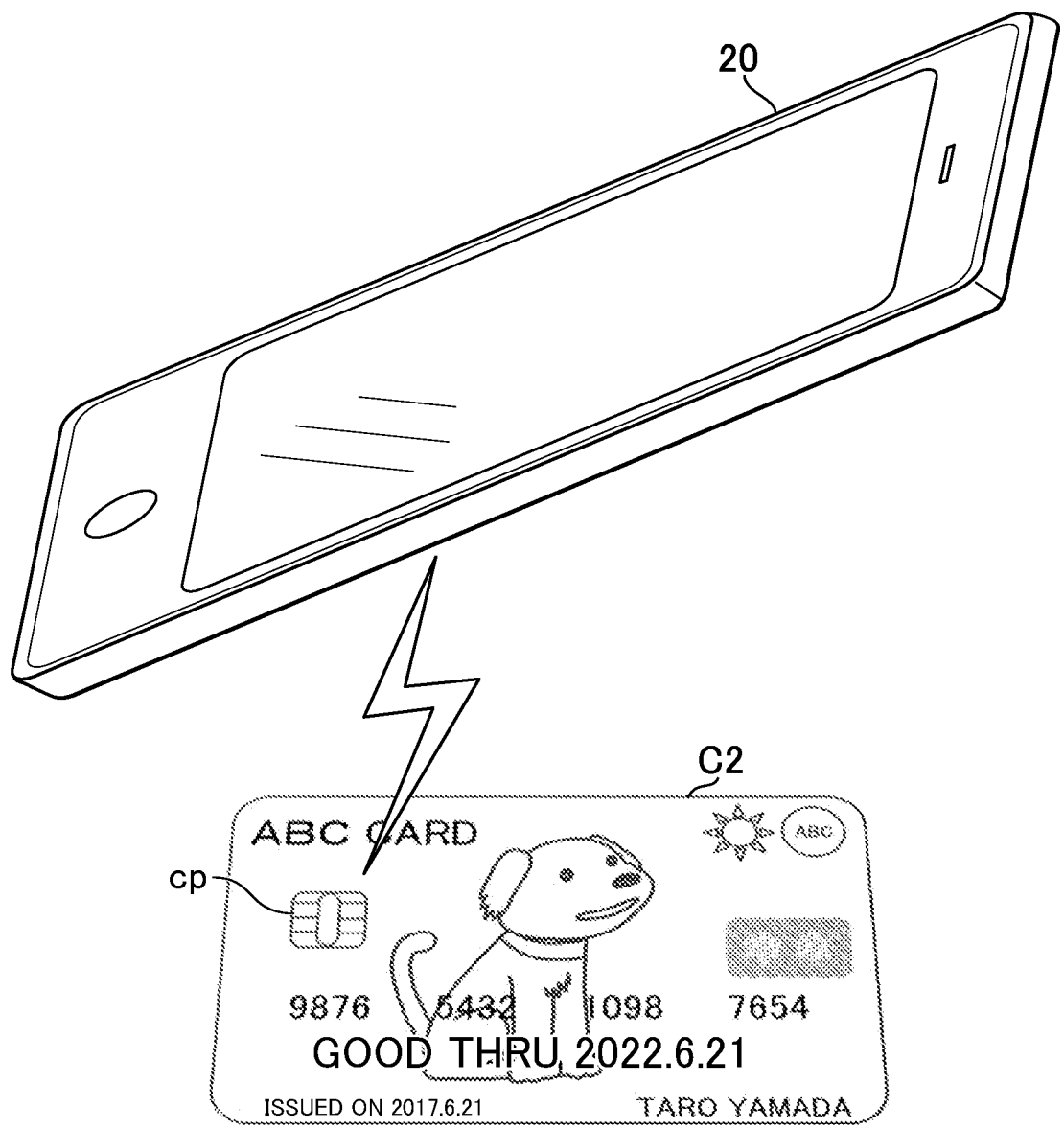
FIG. 11 is a view for illustrating an example of how the IC chip of the card is read by the NFC unit.

FIG. 11 is a view for illustrating an example of how the NFC unit 23A reads the IC chip of the card. In FIG. 11, a card C2 having an electronic money function is taken as an example. The electronic money of the card C2 may be usable from the app, but in the second embodiment, the electronic money of the card C2 is not usable from the app. That is, the electronic money of the card C2 is different from the electronic cash that is usable from the app. The electronic money of the card C2 is used for possession authentication. That is, in the second embodiment, possession authentication is executed by using electronic money in another service that is not directly related to the service provided by the app.

An electronic money ID that can identify the electronic money is recorded on the IC chip cp. As illustrated in FIG. 11, when the user brings the user terminal 20 closer to the IC chip cp of the card C2, the NFC unit 23A reads the information recorded on the IC chip cp. The NFC unit 23A can read any information in the IC chip cp. In the second embodiment, a case in which the NFC unit 23A reads an electronic money ID recorded on the IC chip cp is described.

The user terminal 20 transmits the electronic money ID read from the IC chip cp to the business entity server 30. The electronic money ID is input from the user terminal 20 to the business entity server 30, and is hence hereinafter referred to as "input electronic money ID." In the issuer server 40, the electronic money ID to be used as a correct answer is registered. This electronic money ID is hereinafter referred to as "registered electronic money ID." In the following description, the input electronic money ID and the registered electronic money ID may be referred to simply as unless particularly distinguished "electronic money ID" therebetween.

The business entity server 30 transfers the input electronic money ID received from the user terminal 20 to the issuer server 40. At that time, it is assumed that the input card information on the card C2 selected by the user from the list L130 is also transmitted. When the user is the valid owner of the card C2, the same combination of registered card information and registered electronic money ID as the combination of input card information and input electronic money ID is registered in the issuer server 40.

When the same combination of registered card information and registered electronic money ID as the combination of input card information and input electronic money ID is registered in the issuer server 40, possession authentication is successful. In this case, a success screen G15 indicating that the possession authentication is successful is displayed on the display unit 25. When NFC authentication is executed as illustrated on the success screen G15, the upper limit amount of the card C2 increases from 30,000 yen to 100,000 yen. When the same combination of registered card information and registered electronic money ID as the combination of input card information and input electronic money ID is not registered in the issuer server 40, possession authentication fails. In this case, a failure screen G16 similar to the failure screen G8 of FIG. 3 is displayed on the display unit 25.

Image authentication is also executed based on a similar flow. In NFC authentication, the input electronic money ID is acquired by using the NFC unit 23A, whereas in image authentication, the input electronic money ID is acquired by using a photographed image obtained by photographing the card C2. For example, when the user selects a button B132 of the selection screen G13, the photographing unit 26 is activated. The photographing unit 26 photographs the card C2. In the example of the card C2 of FIG. 11, it is assumed that the input electronic money ID is formed on the back surface, but the input electronic money ID may be formed on the front surface.

When the user photographs the back surface of the card C2, the user terminal 20 transmits the photographed image to the business entity server 30. The business entity server 30 receives the photographed image, and acquires the input card information by executing optical character recognition on the photographed image. The flow after the input card information is acquired is the same as for NFC authentication. The optical character recognition may be executed on the user terminal 20. Similarly to the input individual number in the first embodiment, the input electronic money ID may be included in a code, such as a bar code or a two-dimensional code.

The information used in possession authentication is not limited to the input electronic money ID. For example, when the card C2 also has the function of a loyalty card, a point ID that can identify the points on the card may be used in possession authentication. It is assumed that the point ID is included in the card C2. Further, for example, the card number or expiration date of the card C2 may be used in the possession authentication. In the second embodiment, it suffices that some sort of information contained in the card C2 or information associated with this information is used in the possession authentication, and the design or issue date, for example, of the card C2 may also be used in the possession authentication.

As described above, in the service providing system S according to the second embodiment, the upper limit amount of the card C2 for which the possession authentication has been executed increases. In the same manner as in the first embodiment, the upper limit amount of the card C2 may be set for each user terminal 20. However, in the second embodiment, the upper limit amount is not set for each user terminal 20. A case of setting the upper limit amount for each user terminal 20 is described in modification examples described later.

In the second embodiment, the user can register a plurality of cards C2. When a user has registered a plurality of cards C2 in the app, in order to increase the upper limit amount of each individual card C2, it is required to execute the possession authentication as often as the number of cards C2. In addition, the NFC authentication or other possession authentication may not be supported depending on the card C2. Accordingly, in the second embodiment, when the user has executed the possession authentication for any one of the plurality of cards C2 to increase the upper limit amount, the upper limit amounts of the other cards C2 are also increased, thereby enhancing the convenience of the user. The second embodiment is described below in detail.

2-3. Functions Implemented in Second Embodiment

Figure 12:
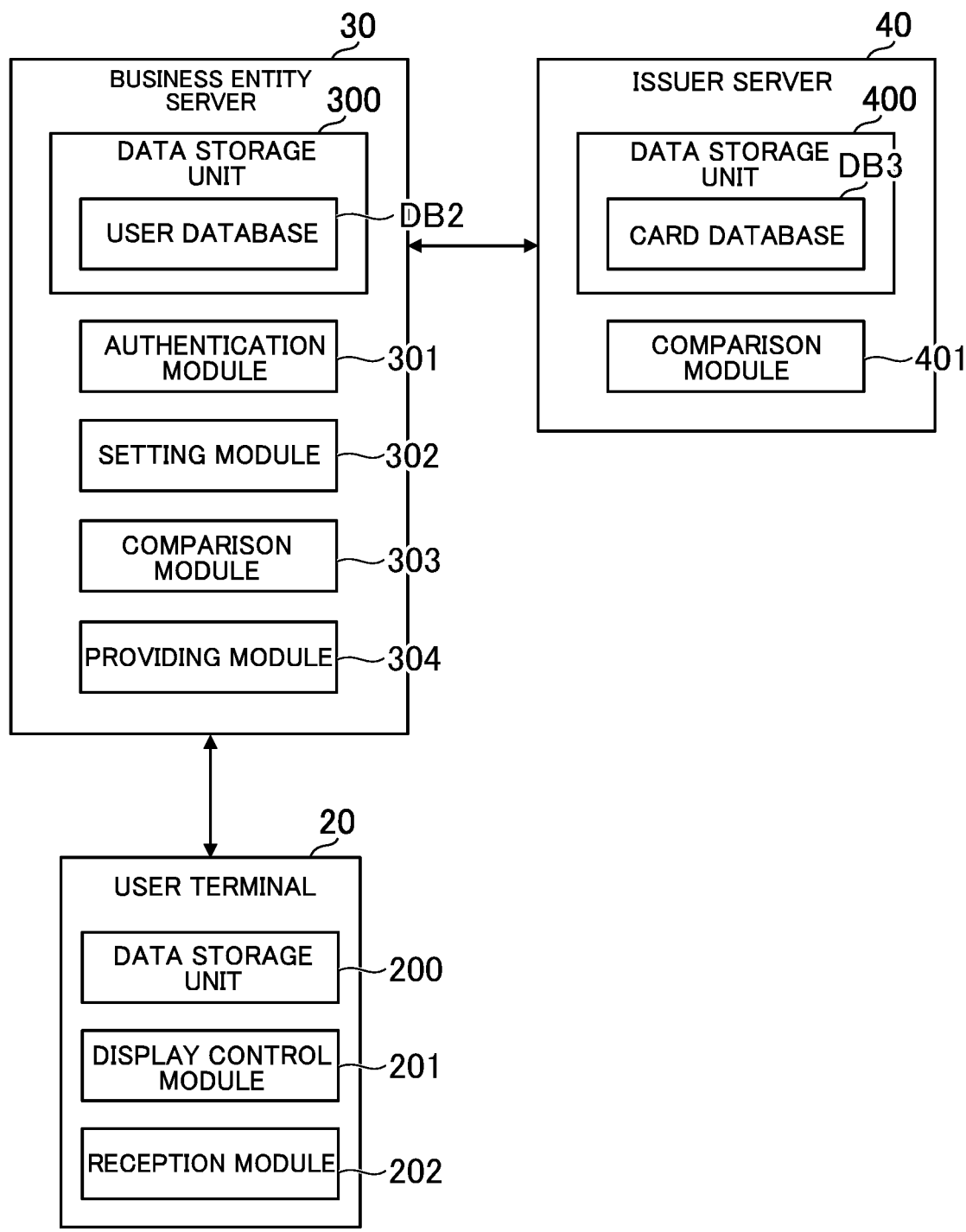
FIG. 12 is a functional block diagram for illustrating an example of functions implemented by the service providing system according to the second embodiment.

FIG. 12 is a functional block diagram for illustrating an example of functions implemented by the service providing system S according to the first embodiment. In this case, the functions implemented on each of the business entity server 30 and the issuer server 40 are described.

[2-3-1. Functions Implemented on Business Entity Server]

As illustrated in FIG. 12, on the business entity server 30, a data storage unit 300, an authentication module 301, a setting module 302, a comparison module 303, and a providing module 304 are implemented. The data storage unit 300 is implemented mainly by the storage unit 32. Each of the authentication module 301, the setting module 302, the comparison module 303, and the providing module 304 is mainly implemented by the control unit 31. Some functions of the data storage unit 300, the authentication module 301, the setting module 302, and the providing module 304 are the same as those of the data storage unit 100, the authentication module 101, the setting module 102, and the providing module 103, which are described in the first embodiment, respectively, and hence points different from those of the first embodiment are described.

[Data Storage Unit]

The data storage unit 300 stores data required for providing the service. For example, the data storage unit stores a user database DB2.

FIG. 13 is a table for showing a data storage example of the user database DB2. As shown in FIG. 13, the user database DB2 is a database in which information relating to users who have completed use registration is stored. For example, the user database DB2 stores a user ID, a password, a full name, payment means of a payment source, registered card information, and electronic cash information. For example, when the user has performed use registration, a user ID is issued and a new record is created in the user database DB2. In this record, the registered card information and the electronic cash information are stored together with the password and full name designated at the time of use registration.

The registered card information is information relating to the card C2 registered by the user. For example, the registered card information includes a serial number for identifying a card from among cards of each of the users, a card number, an expiration date, a card holder, a possession authentication flag, and a usage setting. As described above, the usage setting in the second embodiment is the setting of the upper limit amount of the card C2 that is usable from the app. When the user registers a new card C2, registered card information corresponding to the card C2 is added.

The electronic cash information is information relating to the electronic cash that is usable from the app. For example, the electronic cash information includes an electronic cash ID that can identify the electronic cash and a remaining amount of the electronic cash. Electronic cash can be added to the card C2 registered by the user. The setting of the upper limit amount that can be added in this case may correspond to the usage setting. The information stored in the user database DB2 is not limited to the example of FIG. 13. For example, a usage history including a usage amount of the user and a date and time of use by the user may by stored in the user database DB2. The usage history may also include information that can identify the payment means used by the user.

[Authentication Module]

The authentication module 301 executes the authentication relating to the card C2 of the user. In the second embodiment, the possession authentication is described as an example of this authentication. That is, the authentication in the second embodiment is possession authentication for confirming whether or not the card C2 is possessed through use of the user terminal 20 of the user. The card C2 for which the possession authentication is executed is an example of a first card. Accordingly, the card C2 for which the possession authentication is executed is hereinafter referred to as "first card C2." The authentication method for the first card C2 is not limited to possession authentication. The authentication method for the first card C2 may be any authentication method, and may be, for example, knowledge authentication or biometric authentication. 3D Secure is an example of knowledge authentication. Examples of other authentication methods are as described in the first embodiment.

In the second embodiment, the first card C2 for which the possession authentication is executed includes the input card information to be used for the use of the service and the input electronic money ID that may not be used for the use of the service, and the authentication module 301 executes the possession authentication based on the input electronic money ID. The input card information is an example of first card information. Accordingly, the input card information as used herein can be read as "first card information." The input electronic money ID is an example of second card information. Accordingly, the input electronic money ID as used herein can be read as "second card information."

The first card information may be any information that relates to the first card C2, and is not limited to the combination of the card number, the expiration date, and the card holder that are included in the input card information. For example, the first card information may be only any one of the card number, the expiration date, or the card holder. For example, the first card information may be other information included in the first card C2, and may be, for example, a security code. For example, the first card information may be a combination of two or more of the card number, the expiration date, the card holder, and the security code. The first card information may be information including the address, the telephone number, a birth date, or an email address of the card holder.

The second card information may also be any information that may not be used for the use of the service, and is not limited to the input electronic money ID. The second card information may be an image (design of a card face), for example, an illustration, a photograph, a code, or an icon formed on the first card C2, or may be a hologram pattern. For example, in a case of the first card C2 with a point function, the second card information may be a point ID that can uniquely identify points. In another case, for example, the second card information may be an ID that can identify the IC chip cp.

For example, the authentication module 301 executes NFC authentication, image authentication, or security code authentication, which is one kind of possession authentication. In a case of NFC authentication or image authentication, when the authentication module 301 receives the input card information and the input electronic money ID of the first card C2 from the user terminal 20, the authentication module 301 transmits the input card information and the input electronic money ID of the first card C2 to the issuer server 40. In a case of security code authentication, when the authentication module 301 receives the input card information and the input security code of the first card C2 from the user terminal 20, the authentication module 301 transmits the input card information and the input security code of the first card C2 to the issuer server 40. The authentication module 301 acquires a comparison result obtained by a comparison module 401 of the issuer server 40, which is described later.

When the comparison result is a predetermined result, the authentication module 301 determines that the possession authentication is successful. When the comparison result is not the predetermined result, the authentication module 301 determines that the possession authentication fails. This predetermined result is a result serving as a criterion for success or failure of the possession certification. In the case of NFC authentication or image authentication, the presence of the same combination of registered card information and registered electronic money ID as the combination of the input card information and the input electronic money ID in a card database DB3 corresponds to the predetermined result. In the case of security code authentication, the presence of the same combination of the registered card information and the registered security code as the combination of the input card information and the input security code in the card database DB3 corresponds to the predetermined result.

The predetermined result may be a partial match rather than a perfect match between the input card information and the input electronic money ID. When not only the card number but also the card holder is used for the possession authentication as in the second embodiment, only a partial match of the card holder may be required instead of a perfect match thereof. In a case of the possession authentication for the registered first card C2, the expiration date and the card holder may not be used for the possession authentication, and only the card number may correspond to the input card information.

[Setting Module]

When the possession authentication is executed, the setting module 302 performs a second setting, which is a setting relating to a second card of the user associated with the first card C2. Another card associated with the same user ID as that of the first card C2 is an example of the second card. In the following description, the reference symbol C3 is added to the second card in order to distinguish the second card from the first card C2, but the second card C3 is not shown in the drawings. The second card C3 associated with the first card C2 is a second card C3 associated with the same user ID as the first card C2. The first card C2 and the second card C3 may be directly associated with each other, instead of via the user ID.

The second card C3 is a card on which possession authentication has not been executed. The second card C3 may be a card on which possession authentication can be executed, but has not been executed yet. When the second card C3 is a card on which possession authentication can be executed, the second card C3 may correspond to the first card C2. In the second embodiment, the second card C3 is a card that does not support NFC authentication or image authentication. For example, the second card C3 does not include the input electronic money ID used in NFC authentication or image authentication.

For example, even when the second card C3 includes an IC chip, the IC chip does not include the input electronic money ID. Even when some sort of electronic money ID is included in the IC chip, the electronic money ID is an electronic money ID of other electronic money that is not used in NFC authentication or image authentication. Similarly, even when some sort of electronic money ID is formed on the second card C3, the electronic money ID is an electronic money ID of other electronic money that is not used in NFC authentication or image authentication.

The NFC authentication or the image authentication is an example of a predetermined authentication method executed by the authentication module 301. Accordingly, the NFC authentication or the image authentication as used herein can be read as "predetermined authentication method." The predetermined authentication method is not limited to the NFC authentication or the image authentication. The predetermined authentication method may be any authentication method that is not supported by the second card C3. For example, 3D Secure or another authentication method may correspond to the predetermined authentication method. The second card C3 may be a card that supports the predetermined authentication method. Even in this case, when the upper limit amount of the second card C3 is increased by executing the authentication of the predetermined authentication method for the first card C2 even without executing the authentication of the predetermined authentication method for the second card C3, the convenience of the user is enhanced.

The second setting is a usage setting to be performed when the service is used with the second card C3. The meaning of the usage setting is as described in the first embodiment, and is a setting of the range of use or the use method. In the second embodiment, a case in which the upper limit amount relating to the second card C3 corresponds to the second setting is described, but the second setting may be any other setting. For example, the number of times, frequency, or time that is allowed for the use of the second card C3 may correspond to the second setting.

When the possession authentication for the first card C2 has been executed, the setting module 302 performs the second setting so that the upper limit amount of the second card C3 increases. In the second embodiment, there are a plurality of authentication methods for the possession authentication, and the upper limit amount is set for each individual authentication method. It is assumed that relationships between the authentication methods and the upper limit amounts are determined in advance in the data storage unit 300. The setting module 302 performs the second setting for the second card C3 so that the upper limit amount corresponding to the authentication method of the possession authentication executed for the first card C2 is set. In the above-mentioned example, when NFC authentication or image authentication has been executed for the first card C2, the setting module 302 sets 100,000 yen as the upper limit amount of the second card C3, and when the security code authentication has been executed the first card C2, the setting module 302 sets 30,000 yen as the upper limit amount of the second card C3.

In the second embodiment, when the possession authentication has been executed, the setting module 302 performs a first setting, which is a setting relating to the first card C2. The first setting is a usage setting to be performed when the service is used with the first card C2. The first setting is different from the second setting in that the first setting is a usage setting for the first card C2, but details themselves of the usage setting are the same as those of the second setting. Accordingly, in the second embodiment, a case in which the upper limit amount of the first card C2 corresponds to the first setting is described, but the number of times, frequency, or time that is allowed for the use of the first card C2 may correspond to the first setting.

When the possession authentication for the first card C2 has been executed, the setting module 302 performs the first setting so that the upper limit amount of the first card C2 increases. In the same manner as in the second setting, the setting module 302 may perform the first setting for the first card C2 so that the upper limit amount corresponding to the authentication method of the possession authentication executed for the first card C2 is set. In the second embodiment, a case in which the upper limit amounts of the first setting and the second setting are equal to each other is described, but the setting module 302 may perform the first setting and the second setting so that the upper limit amount of the first card C2 becomes larger than the upper limit amount of the second card C3. In contrast, the setting module 302 may perform the first setting and the second setting so that the upper limit amount of the second card C3 becomes higher than the upper limit amount of the first card C2.

The setting module 302 is not required to perform the first setting. In this case as well, even when the second card C3 does not support NFC authentication or image authentication, the upper limit amount of the second card C3 can be increased through use of the first card C2, thereby enhancing the convenience of the user. When the user has registered three or more cards and there are a plurality of second cards C3, the setting module 302 may perform the second setting for all the plurality of second cards C3, or may perform the second setting only for some of the second cards C3.

For example, when the possession authentication has been executed, the setting module 302 may perform the second setting based on a result of comparison between first holdership information and second holdership information. The first holdership information is information relating to holdership of the first card C2. The second holdership information is information relating to holdership of the second card C3. In the second embodiment, a case in which the first holdership information indicates a first card holder, which is the card holder of the first card C2, and the second holdership information indicates a second card holder, which is the card holder of the second card C3, is described. When the possession authentication has been executed, the setting module 302 performs the second setting based on a result of comparison between the first card holder and the second card holder.

The first card holder is a character string indicating the name of the card holder of the first card C2. The second card holder is a character string indicating the name of the card holder of the second card C3. The character string of the card holder can be represented in any language. Further, each of the first holdership information and the second holdership information may be information other than information on the card holder. For example, each of the first holdership information and the second holdership information may be the address, telephone number, date of birth, gender, or email address of the card holder, a combination thereof, or other personal information.

In the second embodiment, a case in which the comparison module 303 compares the first holdership information and the second holdership information to each other is described, but the comparison between the first holdership information and the second holdership information may be executed by the issuer server 40. For example, when information that is not stored in the user database DB2 is used as the first holdership information and the second holdership information, the comparison between the first holdership information and the second holdership information is executed by the issuer server 40. The setting module 302 performs the second setting when the result of the comparison between the first holdership information and the second holdership information is a predetermined result. The setting module 302 does not perform the second setting when the result of the comparison between the first holdership information and the second holdership information is not the predetermined result. In this case, only the first setting may be performed, or the first setting may not be performed.

The predetermined result is a result serving as a criterion for whether or not to perform the second setting. In the second embodiment, a case in which the matching of the first card holder and the second card holder corresponds to the predetermined result is described, but a matching with the other information described above may correspond to the predetermined result. When a plurality of pieces of information are included in each of the first holdership information and the second holdership information, a match of a predetermined number or more of pieces of the information may correspond to the predetermined result. For example, when each of the first holdership information and the second holdership information includes four pieces of information, for example, the card holder, address, telephone number, and date of birth, the predetermined result may be that two or more pieces of the information match. The matching as used herein may be a partial match rather than a perfect match.

In the example of FIG. 13, the first card holder of the first card C2 (card of No. 2) having the user ID "taro.yamada123" and the second card holder of the second card C3 (card of No. 1) are both "TARO YAMADA." Accordingly, when the possession authentication for the first card C2 has been executed, the upper limit amount of the first card C2 and the upper limit amount of the second card C3 each become 100,000 yen.

Meanwhile, the first card holder of the first card C2 (card of No. 1) having the user ID "hanako.suzuki999" and a second card holder of a certain second card C3 (card of No. 2) are both "HANAKO SUZUKI." Accordingly, when the possession authentication for the first card C2 has been executed, the upper limit amount of the first card C2 and the upper limit amount of the certain second card C3 each become 100,000 yen. However, the second card holder of the other second card C3 (card of No. 3) is "MIKI OKAMOTO," and is different from the first card holder. For that reason, the upper limit amount of the other second card C3 remains 30,000 yen.

[Comparison Module]

The comparison module 303 compares the first holdership information relating to the holdership of the first card C2 and the second holdership information relating to the holdership of the second card C3 to each other. The comparison as used herein is determination of whether or not the first holdership information and the second holdership information match. For example, the comparison module 303 compares the first card holder and the second card holder. The comparison module 303 refers to the user database DB2, acquires the first card holder and the second card holder, and transmits a result of comparison therebetween to the setting module 302. As described above, the first holdership information and the second holdership information may be other information.

[Providing Module]

The providing module 304 provides a service using the second card C3 based on the second setting. For example, the providing module 304 executes the payment processing based on the second card C3 within a range of the upper limit amount indicated by the second setting. When the upper limit amount indicated by the second setting is exceeded, the providing module 304 restricts the execution of the payment processing based on the second card C3. As the payment processing itself, known processing can be used. In a case of a credit card payment, for example, processing for checking a credit limit can be used. In a case of electronic money payment, processing for reducing the balance of electronic money can be used. The providing of the service is not limited to the payment processing, and may be other processing including addition of electronic money.

The providing module 304 provides a service using the first card C2 based on the first setting. For example, the providing module 304 executes the payment processing based on the first card C2 within a range of the upper limit amount indicated by the first setting. When the upper limit amount indicated by the first setting is exceeded, the providing module 304 restricts the execution of the payment processing based on the first card C2. The providing of the service is not limited to the payment processing in the same manner as the providing of the service based on the second setting. It is assumed that the current usage amount of each of the first card C2 and the second card C3 is stored in the user database DB2. Those usage amounts are updated when the payment processing is executed.

[2-3-2. Functions Implemented on Issuer Server]

As illustrated in FIG. 12, on the issuer server 40, a data storage unit 400 and the comparison module 401 are implemented. The data storage unit 400 is implemented mainly by the storage unit 42. The comparison module 401 is implemented mainly by the control unit 41.

[Data Storage Unit]

The data storage unit 400 stores data required for providing a service. For example, the data storage unit 400 stores the card database DB3.

FIG. 14 is a table for showing a data storage example of the card database DB3. As shown in FIG. 14, the card database DB3 is a database in which information relating to the first card C2 is stored. For example, the card database DB3 stores a user ID, a registered card information, a registered security code, and a registered electronic money ID. In the second embodiment, it is assumed that both the business entity and the issuer are companies of the same group and that the user ID is used for various services provided by this group. The user designates a user ID when the first card C2 is to be issued.

For example, when a new first card C2 is issued, a new record is issued in the card database DB3. This record stores the user ID designated at a time of card issuance and the registered card information, registered security code, and registered electronic money ID of the new issued first card C2. The card database DB3 may store information relating to the second card C3. In actuality, there are various issuers, and the issuer server 40 is provided for each of the issuers. For that reason, the card database DB3 may also be provided for each of the issuers. The user ID is not stored in the card database DB3 of an issuer that is not in the same group as that of the business entity.

A match between the user ID stored in the user database DB2 and the user ID stored in the card database DB3 may be required at a time of registration of the first card C2. In another case, for example, the match between those user IDs may be examined at a time of the possession authentication for the first card C2. Further, the user ID is not required to be designated when the first card C2 is issued. The user ID is not required to be stored in the card database DB3.

[Comparison Module]

When NFC authentication or image authentication is to be executed, the comparison module 401 compares the input card information and the input electronic money ID to the registered card information and the registered electronic money ID that are stored in the card database DB3. The comparison module 401 transmits a result of the comparison between those pieces of information to the business entity server 30. This comparison result is information indicating whether or not the same combination of the registered card information and the registered electronic money ID as the combination of the input card information and the input electronic money ID is present. In the comparison between those pieces of information, a perfect match may be required, or a partial match may be required.

When security code authentication is to be executed, the comparison module 401 compares the input card information and the input security code to the registered card information and the registered security code that are stored in the card database DB3. A result of the comparison is information indicating whether or not the same combination of the registered card information and the registered security code as the combination of the input card information and the input security code is present. In the comparison between those pieces of information, a perfect match may be required, or a partial match may be required.

The business entity server 30 may have the function of the comparison module 401. In this case, the card database DB3 is stored in the data storage unit 300 of the business entity server 30. The business entity server 30 may use the card database DB3 stored in the data storage unit 300 to execute the same processing as that executed by the comparison module 401.

[2-3-3. Functions Implemented on User Terminal]

As illustrated in FIG. 12, the function of the user terminal 20 is the same as in the first embodiment.

2-4. Processing to be Executed in Second Embodiment

Figure 15:
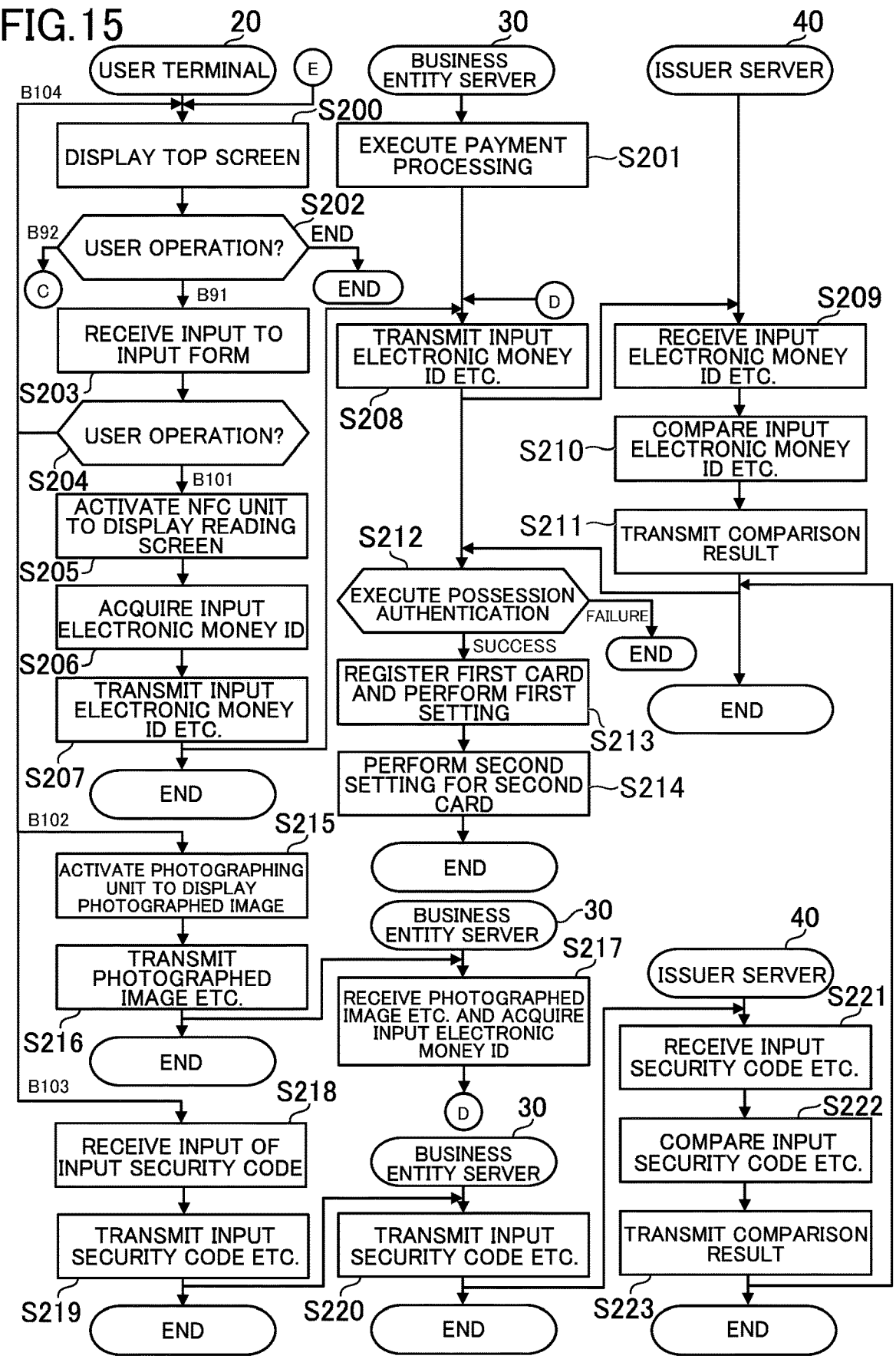
FIG. 15 is a flow chart for illustrating an example of processing to be executed in the second embodiment.
Figure 16:
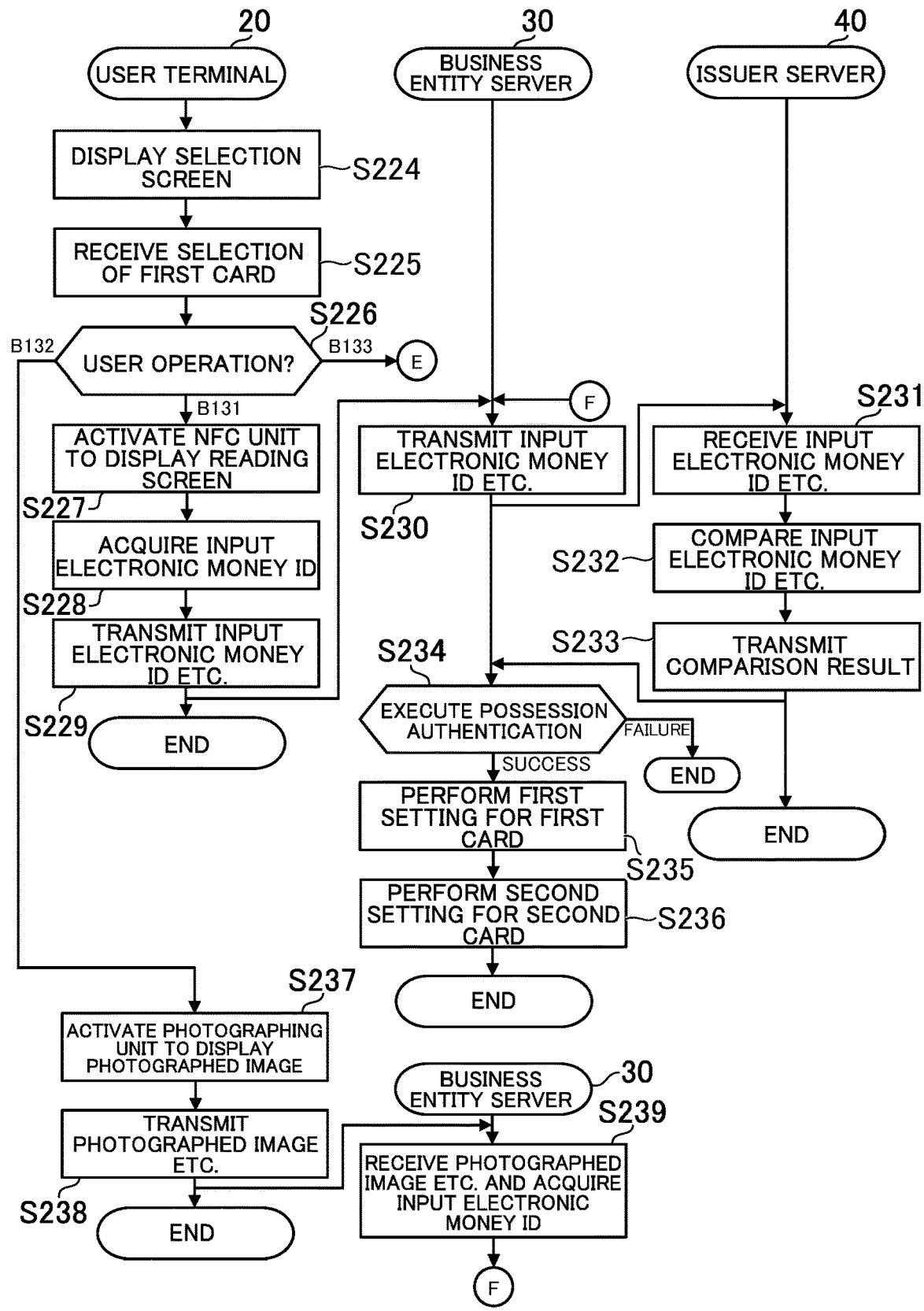
FIG. 16 is a flow chart for illustrating an example of processing to be executed in the second embodiment.

FIG. 15 and FIG. 16 are flow charts for illustrating an example of processing to be executed in the second embodiment. The processing illustrated in FIG. 15 and FIG. 16 is executed by the control units 21, 31, and 41 operating in accordance with the programs stored in the storage units 22, 32, and 42, respectively. This processing is an example of processing to be executed by the functional blocks illustrated in FIG. 12. It is assumed that, before the execution of this processing, the use registration by the user is complete.

As illustrated in FIG. 15, when the user selects an app, the user terminal 20 activates the app to display the top screen G9 on the display unit 25 (Step S200). In Step S200, login may be executed between the business entity server 30 and the user terminal 20 in the same manner as in Step S100 in the first embodiment. When the code C90 on the top screen G9 is read by a POS terminal or the like at a shop, the business entity server 30 executes the payment processing based on the user database DB2 (Step S201). When the code C90 cannot be read by the POS terminal or the like, the processing step of Step S201 is not executed.

In Step S201, the business entity server 30 receives information included in the code C90 from the POS terminal or the like, and identifies the user ID of the user who is about to execute the payment processing based on this information. This information may be the user ID itself, but now, a case in which this information is different from the user ID is described. This information is a temporarily effective ID, and is generated by the business entity server 30 at any timing, for example, when the app is activated. It is assumed that this information is stored in the user database DB2 in association with the user ID. The business entity server 30 executes the payment processing based on the payment means of the payment source set by the user.

The user terminal 20 identifies an operation of the user based on a detection signal obtained by the operating unit 24 (Step S202). In Step S202, the selection of the button B91 or the button B92 is performed. When the user has performed an operation for ending the app or an operation for shifting the app to the background ("end" in Step S202), this process ends.

When the button B91 is selected in Step S202 ("B91" in Step S202), the user terminal 20 displays the registration screen G10 for registering the first card C2 on the display unit 25, and receives input to the input form F100 (Step S203). The user terminal 20 identifies an operation of the user based on a detection signal obtained by the operating unit 24 (Step S204). In Step S204, the selection of the button B101, the selection of the button B102, the selection of the button B103, or the selection of the button B104 is performed. When the button B104 is selected ("B104" in Step S204), the process returns to Step S200.

When the button B101 is selected ("B101" in Step S204), the user terminal 20 activates the NFC unit 23A to display the reading screen G14 on the display unit 25 (Step S205). The user terminal 20 uses the NFC unit 23A to acquire the input electronic money ID from the IC chip cp of the first card C2 (Step S206), and transmits, to the server 10, the input card information including the card number, the expiration date, and the card holder that have been input to the input form F100 and the input electronic money ID acquired from the first card C2 (Step S207).

When the business entity server 30 receives the input card information and the input electronic money ID from the user terminal 20, the business entity server 30 transmits the input card information and the input electronic money ID to the issuer server 40 (Step S208). When the issuer server 40 receives the input card information and the input electronic money ID (Step S209), the issuer server 40 compares the input card information and the input electronic money ID that have been received to the registered card information and the registered electronic money ID that are registered in the card database DB3 (Step S210).

The issuer server 40 transmits the comparison result obtained in Step S210 to the business entity server 30 (Step S211). This comparison result indicates whether or not the same combination of the registered card information and the registered electronic money ID as the combination of the input card information and the input electronic money ID is present. When the business entity server 30 receives the comparison result from the issuer server 40, the business entity server 30 executes the possession authentication based on the comparison result (Step S212). In Step S212, when the comparison result indicates that the above-mentioned combination is present, the possession authentication is successful. When the comparison result indicates that the combination is not present, the possession authentication fails.

When the possession authentication is successful ("success" in Step S212), the business entity server 30 registers a new first card C2 in the user database DB2, performs the first setting for the first card C2 (Step S213), and performs the second setting for the registered second card C3 (Step S214). In Step S213, the upper limit amount corresponding to the executed possession authentication is set. In this case, the NFC authentication is successful, and hence 100,000 yen is set as the upper limit amount of the first card C2. In the same manner, in Step S214, 100,000 yen is set as the upper limit amount of the second card C3 associated with the user ID of the user who has logged in. In Step S214, the business entity server 30 refers to the user database DB2 to compare the first card holder of the first card C2 and the second card holder of the second card C3 to each other. When those card holders do not match, the second setting is not performed. When the possession authentication fails ("failure" in Step S212), a predetermined error message is displayed, and this process ends.

When the button B102 is selected in Step S204 ("B102" in Step S204), the user terminal 20 activates the photographing unit 26 to display the photographed image being photographed on the display unit 25 (Step S215). When the user performs a predetermined photographing operation, the user terminal 20 transmits, to the server 10, the input card information input to the input form F100 and the photographed image (Step S216). When the server 10 receives the input card information and the photographed image from the user terminal 20, the server 10 uses optical character recognition to acquire the input electronic money ID from the photographed image (Step S217), and the process advances to Step S208.

When the button B103 is selected in Step S204 ("B103" in Step S204), the user terminal 20 displays the authentication screen G11 on the display unit 25, and receives the input of the security code (Step S218). When the button B111 is selected, the user terminal 20 transmits, to the business entity server 30, the input card information input to the input form F100 and the input security code input to the input form F110 (Step S219).

When the business entity server 30 receives the input card information and the input security code from the user terminal 20, the business entity server 30 transmits the input card information and the input security code to the issuer server 40 (Step S220). The subsequent processing steps of from Step S221 to Step S223 are different from the processing steps of from Step S209 to Step S211 only in that the security code is used for the possession authentication instead of the input electronic money ID, and the other points are the same. In this case, the upper limit amount set in Step S213 is the lowest amount. When the upper limit amount of the second card C3 is higher, the processing step of Step S214 is not executed.

When the button B92 is selected in Step S202 ("B92" in Step S202), the process advances to FIG. 16, and the user terminal 20 displays the selection screen G13 on the display unit 25 (Step S224). The user terminal 20 receives the selection of the first card C2 from the list L130 (Step S225). The user terminal 20 identifies an operation of the user based on a detection signal obtained by the operating unit 24 (Step S226). In Step S226, the selection of the button B131, the selection of the button B132, or the selection of the button B133 is performed. When the button B133 is selected ("B133" in Step S226), the process returns to Step S200. When the first card C2 for which NFC authentication or image authentication has been executed is selected, the buttons B131 and B132 may be inhibited from being selected.

When the button B131 is selected ("B131" in Step S226), the same processing steps of from Step S227 to Step S236 as the processing steps of from Step S205 to Step S214 are executed. However, the first card C2 has already been registered. For that reason, in Step S229, it suffices that information that can identify the first card C2 selected from the list L130 is transmitted as the input card information, and the same input card information as that of Step S207 is not required to be transmitted. In the same manner, in Step S230, only the card number may be transmitted as input card information. In Step S235, the first card C2 has already been registered, and hence only the upper limit amount is changed.

When the button B132 is selected ("B132" in Step S226), the same processing steps of from Step S237 to Step S239 as the processing steps of from Step S215 to Step S217 are executed. In Step S238, it suffices that information that can identify the first card C2 selected from the list L130 is transmitted as the input card information, and the same input card information as that of Step S216 is not required to be transmitted. In the same manner, in Step S239, only the card number may be transmitted as input card information.

According to the second embodiment, when the possession authentication for the first card C2 has been executed, the second setting for the second card C3 of the user associated with the first card C2 is performed, and a service using the second card C3 is provided based on the second setting. Accordingly, the second setting for the second card C3 can be performed without executing the possession authentication for the second card C3, and hence the convenience of the user is enhanced when the user uses the second card C3. For example, even when the second card C3 does not support the possession authentication, it can be confirmed by the possession authentication for the first card C2 that the user who has logged in has high reliability to some extent, and hence the second setting is performed so that the upper limit amount of the second card C3 increases. This facilitates the use of the second card C3, thereby enhancing the convenience of the user. The possession authentication for the first card C2 has been executed, and the upper limit amount of the second card C3 is increased after the reliability has been confirmed to some extent, to thereby suppress fraudulent use by a third party and enhance the security.

Further, when the possession authentication for the first card C2 has been executed, the service providing system S performs the first setting for the first card C2, and provides a service using the first card C2 based on the first setting. This enhances the convenience of the user when the user uses the first card C2. For example, the first setting is performed so that the upper limit amount of the first card C2 increases after it has been confirmed by the possession authentication for the first card C2 that the user is a valid owner of the first card C2, to thereby suppress fraudulent use by a third party and enhance the security.

Further, when the possession authentication for the first card C2 has been executed, the service providing system S performs the second setting for the second card C3 based on a result of the comparison between the first holdership information relating to the holdership of the first card C2 and the second holdership information relating to the holdership of the second card C3. For example, when the possession authentication for the first card C2 has been executed, the upper limit amount of the second card C3 may be unconditionally increased, but in this case, there is a fear in that fraudulent use by a third party may occur. Specifically, it is assumed that a third party has illegally logged in through use of an illegally obtained user ID and password, has registered his or her own first card C2 without permission, and has executed the possession authentication. In this case, the upper limit amount of the second card C3 of another person that has been originally registered adversely increases, and there is a fear in that the third party who has illegally logged in is to illegally use the second card C3 to a great extent. In this respect, when the second setting for the second card C3 is performed based on the result of the comparison between the first holdership information and the second holdership information, a third party cannot increase the upper limit amount of the second card C3 of another person that has been originally registered, and hence fraudulent use by a third party is suppressed, thereby enhancing the security.

Further, the service providing system S performs the second setting for the second card C3 based on the result of the comparison between the first card holder being the card holder of the first card C2 and the second card holder being the card holder of the second card C3. Accordingly, even when a third party has illegally logged in through use of an illegally obtained user ID and password, has registered his or her own first card C2 without permission, and has executed the possession authentication, the second card C3 of another person that has been originally registered has a different card holder, and hence it is possible to prevent the upper limit amount of the second card C3 of another person from increasing. This suppresses fraudulent use by a third party, thereby enhancing the security.

Further, the service providing system S performs the second setting for the second card C3 when the possession authentication for confirming whether or not the first card C2 is possessed has been executed through use of the user terminal 20 of the user. Thus, the user terminal 20 is used to easily and reliably confirm whether or not the user is a valid owner of the first card C2, and the convenience of the user is enhanced, to thereby suppress fraudulent use by a third party and enhance the security.

Further, the service providing system S executes the possession authentication based on the input electronic money ID that may not be used for the use of the service. Even when a third party has illegally logged in through use of an illegally obtained user ID and password, a part of the card number or some other information may be checked, but the input electronic money ID that is not used for the service in principle cannot be checked. Thus, the security is effectively enhanced by executing the possession authentication through use of the input electronic money ID that cannot be known by a third party in principle.

Further, the service providing system S performs the second setting for the second card C3 that does not support the possession authentication, to thereby enhance the convenience of the user when the second card C3 is used. Even when the second card C3 does not support the possession authentication, the possession authentication can be executed based on the first card C2 associated with the same user ID, and hence it is possible to confirm the identity of the user relating to this user ID and then increase the upper limit amount of the second card C3 as well.

Further, when the possession authentication for the first card C2 has been executed, the service providing system S performs the second setting for the second card C3 so that the upper limit amount of the second card C3 increases, to thereby enhance the convenience of the user in the electronic payment service.

3. Modification Examples

The present disclosure is not limited to the embodiments described above, and can be modified suitably without departing from the spirit of the present disclosure.

3-1. Modification Examples of First Embodiment

First, modification examples of the first embodiment are described. That is, modification examples relating to configurations in which the usage setting is performed for each user terminal 20 based on whether or not the possession authentication has been executed from the user terminal 20 are described.

The service providing system S described in the first embodiment can be applied to any service. In the modification examples of the first embodiment, an electronic payment service is described as an example of the service. Details of the electronic payment service are as described in the second embodiment. In the same manner as in the second embodiment, the electronic payment service is hereinafter referred to simply as "service."

An overall configuration of the service providing system S is exemplified by the same configuration as that in the second embodiment, but the processing described in the second embodiment is not required to be executed. That is, in the modification examples of the first embodiment, when the possession authentication for the first card C2 has been executed, the processing for increasing the upper limit amount of the second card C3 is not required to be executed.

In the modification examples of the first embodiment, the first card C2 and the second card C3 that are described in the second embodiment are each referred to as "card C" unless particularly distinguished therebetween. The user may register only one card C.

Figure 17:
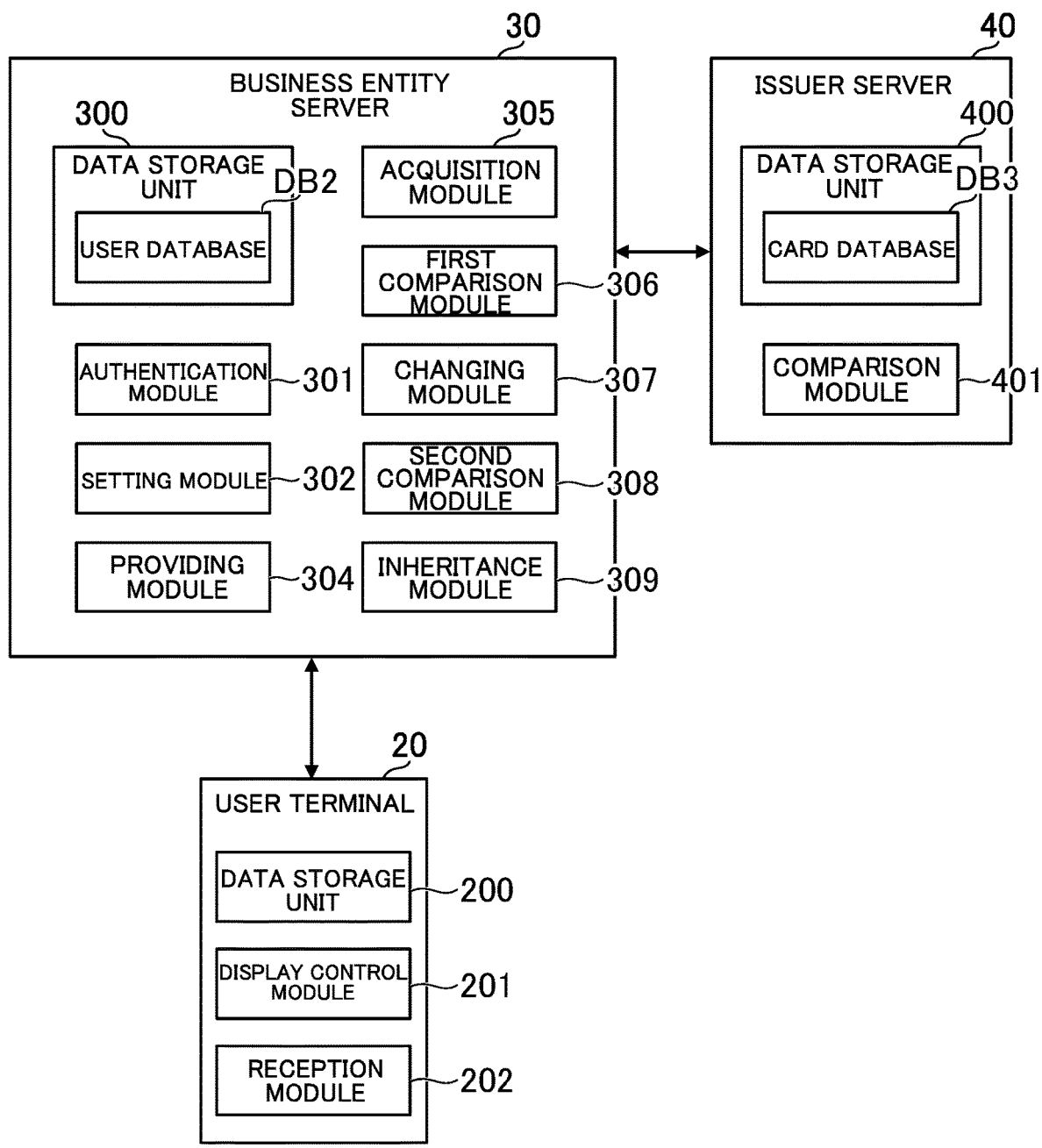
FIG. 17 is a functional block diagram in modification examples of the first embodiment.

FIG. 17 is a functional block diagram in the modification examples of the first embodiment. In the modification examples described below, the data storage unit 300, the authentication module 301, the setting module 302, and the providing module 304 have the same function as those of the data storage unit 100, the authentication module 101, the setting module 102, and the providing module 103, respectively, that are described in the first embodiment. As illustrated in FIG. 17, in addition to the functions described in the first embodiment, an acquisition module 305, a first comparison module 306, a changing module 307, a second comparison module 308, and an inheritance module 309 are implemented. Each of those functions is mainly implemented by the control unit 11.

Modification Example 1-1

For example, in Modification Example 1-1, the user operates the user terminal 20 to register the card C in the same manner as in the flow of FIG. 9 described in the second embodiment. The card C for which NFC authentication or image authentication has been executed is subjected to the usage setting so that the upper limit amount increases. However, Modification Example 1-1 different from the second embodiment in that the usage setting of the upper limit amount of the card C is a setting performed for each user terminal 20.

For example, even when the user executes NFC authentication or image authentication for the card C from the first user terminal 20A, the upper limit amount of the card C increases only for the first user terminal 20A. Even in a case in which the user uses the second user terminal 20B, when NFC authentication or image authentication for the card C has not been executed from the second user terminal 20B, the upper limit amount remains low for the case of using the card C from the second user terminal 20B. Thus, even when a third party illegally logs in, the upper limit amount of the user terminal 20 of the third party is low, to thereby be able to suppress fraudulent use.

In Modification Example 1-1, substantially the same functional blocks as the functional blocks of FIG. 12, which are described in the second embodiment, are implemented, but details of data and processing are different from those in the second embodiment. For example, the user database DB2 in Modification Example 1-1 is different from that in the second embodiment. The card database DB3 may be the same as that in the second embodiment.

FIG. 18 is a table for showing a data storage example of the user database DB2 in Modification Example 1-1. As shown in FIG. 18, in the same manner as in the second embodiment, the usage setting in Modification Example 1-1 is the usage setting of the upper limit amount in a service. In the second embodiment, the usage setting of the upper limit amount is present for each card C associated with the user ID, but in Modification Example 1-1, the possession authentication flag and the usage setting of the upper limit amount are present for each card C and each terminal ID. In the example of FIG. 18, the upper limit amount to be set when NFC authentication has been executed is 100,000 yen, and the upper limit amount to be set when image authentication has been executed is 70,000 yen. However, those upper limit amounts may be the same as in the second embodiment.

In the example of FIG. 18, the user ID "taro.yamada123" has ever been used for login from two user terminals 20. Thus, two terminal IDs are associated with this user ID. Two cards C are associated with this user ID, and hence there are four combinations of the card C and the terminal ID. Accordingly, there are four combinations of the possession authentication flag and the usage setting of the upper limit amount. The same applies to another user ID, and there are as many combinations of the possession authentication flag and the usage setting of the upper limit amount as combinations of the number of user terminals 20 from which login has been performed through use of the another user ID and the number of cards C associated with the another user ID.

The setting module 302 sets each user terminal 20 so that the upper limit amount thereof increases when the possession authentication has been executed. The setting module 302 performs the usage setting so that the upper limit amount that can be used from the user terminal 20 for which the possession authentication has been executed increases. Even when the user terminal 20 for which the possession authentication has not been executed logs in through use of the same user ID as that used for the user terminal 20 for which possession authentication has been executed, the upper limit amount that can be used by the user is not increased.

In Modification Example 1-1, the case in which the upper limit amount that can be used from a card C increases when the possession authentication for the card C has been executed has been described, but the upper limit amount of other payment means may increase. For example, when the possession authentication for the card C has been executed, the upper limit amount of electronic cash may be increased. When electronic money, a bank account, or other payment means can be used from an app, the upper limit amount of the other payment means may be increased.

According to Modification Example 1-1, each user terminal 20 is set so that the upper limit amount thereof increases when the possession authentication has been executed, to thereby enhance the security. For example, even when a third party illegally logs in from his or her own user terminal 20, he or she does not have the card C, and cannot execute the possession authentication. Accordingly, even when a third party illegally logs in, the upper limit amount that can be used by the third party can be reduced. As a result, fraudulent use by a third party can be suppressed, to thereby enhance the security of the service.

Modification Example 1-2

In the first embodiment, the case in which whether or not the possession authentication has been executed is managed based on the possession authentication flag has been described as an example, but there may be another index, such as a reliability level of the user terminal 20. The service providing system S according to Modification Example 1-2 includes the acquisition module 305 for acquiring, for each user terminal 20, a reliability level relating to the user terminal 20 based on whether or not the possession authentication has been executed for the user terminal 20. The reliability level is information indicating a level of reliability of the user terminal 20. In Modification Example 1-2, a case in which the reliability level is expressed by a numerical value is described, but the reliability level may be expressed in another format, for example, by a character or a symbol.

As the reliability level of the user terminal 20 becomes higher, the reliability of the user terminal 20 becomes higher.

FIG. 19 is a table for showing a data storage example of the user database DB2 in Modification Example 1-2. As shown in FIG. 19, the user database DB2 stores, for each user terminal 20, the reliability level of the user terminal 20. That is, the reliability level is associated with each individual terminal ID. The acquisition module 305 sets the reliability level so that the reliability level of a certain user terminal 20 becomes higher when the possession authentication has been executed from the certain user terminal 20.

For example, the acquisition module 305 sets the reliability level so that the reliability level of a certain user terminal 20 becomes the highest level when the NFC authentication has been executed from the certain user terminal 20. The acquisition module 305 sets the reliability level so that the reliability level of a certain user terminal 20 becomes a medium level when the image authentication has been executed 1 from the certain user terminal 20. The acquisition module 305 sets the reliability level so that the reliability level of a certain user terminal 20 becomes the lowest level when the security code authentication has been executed from the certain user terminal 20.

The reliability level of the user terminal 20 may be changed depending on a use status of the service received from the user terminal 20 as in Modification Example 1-6 described later. For example, the acquisition module 305 increases the reliability level of the user terminal 20 as the usage amount or the number of times of use from the user terminal 20 increases. In addition, for example, details of use from the user terminal 20 is checked by an administrator, and the acquisition module 305 increases the reliability level of the user terminal 20 confirmed to have no problem based on the checking by the administrator. The acquisition module 305 may increase the reliability level of the user terminal 20 as a period during which the user terminal 20 has been confirmed to have no problem becomes longer.

The setting module 302 performs the usage setting for each user terminal 20 based on the reliability level of the user terminal 20. The setting module 302 performs the usage setting so that the restriction on the use of the service from the user terminal 20 is lifted to a greater extent as the reliability level of this user terminal 20 becomes higher. For example, the setting module 302 performs the usage setting of the upper limit amount so that the upper limit amount allowed from the user terminal 20 becomes higher as the reliability level of this user terminal 20 becomes higher. When the number of times of use or the time of use are set as the usage setting, the setting module 302 may perform the usage setting of the number of times of use or the time of use so that, as the reliability level of the user terminal 20 becomes higher, the number of times of use from this user terminal 20 becomes larger or the time of use from this user terminal 20 becomes longer. It is assumed that a relationship between the reliability level and the usage setting is defined in advance in the data storage unit 300.

According to Modification Example 1-2, the usage setting is performed for each user terminal 20 based on the reliability level relating to the user terminal 20, to thereby be able to perform a more flexible usage setting. As a result, fraudulent use by a third party is effectively suppressed, and the security is further enhanced. From the viewpoint of the user as well, the convenience is enhanced by the flexible usage setting.

Modification Example 1-3

For example, the first embodiment and the second embodiment may be combined so that, when the possession authentication for the first card C2 has been executed from a certain user terminal 20, the upper limit amount allowed when the second card C3 is used from the certain user terminal 20 increases. In the possession authentication in Modification Example 1-3, it is confirmed whether or not the first card C2 associated with the user ID used for login to the service is possessed. The possession authentication for the first card C2 itself is as described in the second embodiment.

The usage setting in Modification Example 1-3 is a usage setting to be performed when the service is used by the second card C3 associated with the user ID, and the setting module 302 performs the usage setting for the second card C3 for each user terminal 20 based on whether or not the possession authentication for the first card C2 has been executed from the user terminal 20. Modification Example 1-3 is different from the second embodiment only in that the usage setting for the second card C3 is present for each user terminal 20, and the processing itself for increasing the upper limit amount of the second card C3 is as described in the second embodiment.

In Modification Example 1-3, as described in Modification Example 1-1, the usage setting of the upper limit amount of the second card C3 is present for each user terminal 20. Thus, the setting module 302 performs the usage setting so that the upper limit amount of the second card C3 associated with the terminal ID of the user terminal 20 for which the possession authentication has been executed increases. Even when the user ID is the same, the usage setting for the second card C3 associated with another terminal ID is not changed. The providing module 304 provides a service to each user terminal 20 based on the usage setting of the user terminal 20 for the second card C3. A service providing method itself is as described in the second embodiment and Modification Example 1-1.

According to Modification Example 1-3, the usage setting for the second card C3 is performed for each user terminal 20 based on whether or not the possession authentication for the first card C2 has been executed from the user terminal 20, and a service is provided to each user terminal 20 based on the usage setting of the user terminal 20 for the second card C3. Accordingly, for the same reason as in the second embodiment, the convenience of the user is enhanced, and the security is enhanced as well.

Modification Example 1-4

For example, when the upper limit amount of the second card C3 is increased as in Modification Example 1-3, the result of the comparison between the first holdership information and the second holdership information may be used as the condition as described in the second embodiment. The service providing system S according to Modification Example 1-4 further includes the first comparison module 306 for comparing the first holdership information relating to the holdership of the first card C2 and the second holdership information relating to the holdership of the second card C3 to each other. The first comparison module 306 is the same as the comparison module 303, which has been described in the second embodiment. The meaning of each of the first holdership information and the second holdership information is also as described in the second embodiment.

The setting module 302 performs the setting for the second card C3 for each user terminal 20 based on whether or not the possession authentication for the first card C2 has been executed from the user terminal 20 and the result of the comparison between the first holdership information and the second holdership information. Modification Example 1-4 is different from the second embodiment only in that the usage setting for the second card C3 is present for each user terminal 20, and the processing itself for increasing the upper limit amount of the second card C3 is as described in the second embodiment. The point that each of the first holdership information and the second holdership information may be information other than the card holder is also as described in the second embodiment.

According to Modification Example 1-4, the setting for the second card C3 is performed for each user terminal 20 based on whether or not the possession authentication for the first card C2 has been executed from the user terminal 20 and the result of the comparison between the first holdership information and the second holdership information. Accordingly, for the same reason as in the second embodiment, the convenience of the user is enhanced, and the security is enhanced as well.

Modification Example 1-5

For example, when the usage setting for the second card C3 is performed as in Modification Example 1-3 and Modification Example 1-4, the second card C3 may be a card that does not support the possession authentication in the same manner as in the second embodiment. The setting module 302 performs, for each user terminal 20, the setting for the second card C3 for which the possession authentication has not been executed based on whether or not the possession authentication for the first card C2 has been executed from the user terminal 20. Modification Example 1-5 is different from the second embodiment only in that the usage setting for the second card C3 is present for each user terminal 20, and the processing itself for increasing the upper limit amount of the second card C3 is as described in the second embodiment.

According to Modification Example 1-5, the setting for the second card C3 for which the possession authentication has not been executed is performed for each user terminal 20 based on whether or not the possession authentication for the first card C2 has been executed from the user terminal 20. Accordingly, for the same reason as in the second embodiment, the convenience of the user is enhanced, and the security is enhanced as well.

Modification Example 1-6

For example, the usage setting performed by executing the possession authentication may be changed depending on the subsequent use status of the service. The service providing system S according to Modification Example 1-6 includes the changing module 307 for changing the usage setting for each user terminal 20 based on the use status of the service received from the user terminal 20. The use status is information indicating how the service has been used. For example, the usage amount, the number of times of use, the frequency of use, the time of use, the place of use, or a combination thereof corresponds to the use status. The usage history of the service is also an example of the use status. It is assumed that information relating to the use status of the service is stored in the user database DB2, but the information may be stored in another database.

For example, the changing module 307 changes the usage setting so that the upper limit amount of a user terminal 20 increases as the usage amount or the number of times of use from the user terminal 20 increases. In addition, for example, details of use from the user terminal 20 is checked by the administrator, and the changing module 307 changes the usage setting so that the upper limit amount of the user terminal 20 confirmed to have no problem based on the checking by the administrator increases. The changing module 307 may change the usage setting so that the upper limit amount of the user terminal 20 increases as the period during which the user terminal 20 has been confirmed to have no problem becomes longer. The changing module 307 may change the reliability level described in Modification Example 1-2 based on the use status of the service.

The providing module 304 provides a service to each user terminal 20 based on the usage setting of the user terminal 20 which has been changed by the changing module 307. Modification Example 1-6 is different from the other modification examples only in that the usage setting changed by the changing module 307 is used, and processing itself for providing a service based on the usage setting is the same as in the other modification examples.

According to Modification Example 1-6, a service is provided to each user terminal 20 based on the usage setting of the user terminal 20 which has been changed based on the use status of the service from the user terminal 20. Thus, the usage setting is performed based on the actual use status of the user, and hence the convenience of the user is enhanced. When the usage setting is performed so that a third party who has actually illegally used a service is to no longer easily use the service or is to be unable to use the service, the fraudulent use of the service is suppressed, thereby enhancing the security.

Modification Example 1-7

For example, there is a case in which the user issues a plurality of user IDs to properly use different user IDs from one user terminal 20. In this case, a service provided by the service providing system S may be logged in to from the same user terminal 20 through use of each of the plurality of user IDs. The authentication module 301 can execute the possession authentication for each user terminal 20 under the state in which the service has been logged in to from the user terminal 20 through use of the user ID. Modification Example 1-7 is different from the first embodiment and the other modification examples only in that login can be performed from one user terminal 20 through use of each of a plurality of user IDs, and the processing of the authentication module 301 is the same.

The setting module 302 performs the usage setting for each combination of the user terminal 20 and the user ID based on whether or not the authentication has been executed under the state in which the service has been logged in to from this user terminal 20 through use of this user ID. The point that the usage setting is present for each combination of the user terminal 20 and the user ID is as described in the first embodiment. The providing module 304 provides a service for each combination of the user terminal 20 and the user ID based on the usage setting of the combination. The processing of the setting module 302 and the providing module 304 is also different from the processing in the first embodiment and the other modification examples only in that login can be performed from one user terminal 20 through use of each of a plurality of user IDs, and details themselves of the processing are the same.

According to Modification Example 1-7, a service is provided for each combination of the user terminal 20 and the user ID based on the usage setting performed based on whether or not the authentication has been executed under the state in which the service has been logged in to from this user terminal 20 through use of this user ID. Thus, even when a plurality of user IDs are properly used from one user terminal 20, the convenience of the user is enhanced, and the fraudulent use of the service is suppressed, thereby enhancing the security.

Modification Example 1-8

For example, assuming that the plurality of user IDs described in Modification Example 1-7 include a first user ID and a second user ID, the authentication module 301 can execute the possession authentication for the user terminal 20 from which the service has been logged in to through use of the first user ID. This possession authentication itself is as described in the first embodiment and the other modification examples.

When the possession authentication has been executed for the user terminal 20 from which the service has been logged in to through use of the first user ID, the setting module 302 may perform the usage setting corresponding to the second user ID that has ever been used for login from this user terminal 20. When the possession authentication has been executed under a state in which login has been performed through use of the first user ID, the setting module 302 may perform the usage setting so that the upper limit amount of the card C associated with the second user ID increases even when login has ever been performed from the same user terminal 20 through use of the second user ID and the possession authentication has not been executed under a state in which login has been performed through use of the second user ID. In this case, the upper limit amount of the same card C as the card C for which the possession authentication has been executed may be increased, or the upper limit amount of another card C may be increased.

The providing module 304 provides a service to the user terminal 20 from which the service has been logged in to through use of the second user ID based on the usage setting corresponding to the second user ID. Modification Example 1-8 is different from the other modification examples only in that the usage setting corresponding to the second user ID changed by the possession authentication for the first user ID is used, and the processing itself for providing a service based on the usage setting is the same as in the other modification examples.

According to Modification Example 1-8, when the authentication has been executed for the user terminal 20 from which the service has been logged in to through use of the first user ID, the usage setting corresponding to the second user ID that has ever been used for login from this user terminal 20 is performed. A service is provided to the user terminal 20 from which the service has been logged in to through use of the second user ID based on the usage setting corresponding to the second user ID. Accordingly, the user can increase the upper limit amount of the card C associated with the second user ID without executing the possession authentication under the state in which login has been performed through use of the second user ID, and hence the convenience of the user is enhanced.

Modification Example 1-9

For example, in Modification Example 1-7 and Modification Example 1-8, the matching of the full name and the like of the first user ID and the full name and the like of the second user ID may be used as a condition for performing the usage setting corresponding to the second user ID.

The service providing system S according to Modification Example 1-9 further includes the second comparison module 308 for comparing first user information associated with the first user ID and second user information associated with the second user ID to each other. Each of the first user information and the second user information is information relating to the user. For example, each of the first user information and the second user information is the full name, address, telephone number, date of birth, gender, or email address of the user or a combination thereof. In addition, for example, each of the first user information and the second user information may be other personal information, or may be occupation, annual income, or other such information that is not called personal information. It is assumed that each of the first user information and the second user information is stored in the user database DB2.

When the authentication has been executed for the user terminal 20 from which the service has been logged in to through use of the first user ID, the setting module 302 performs the usage setting corresponding to the second user ID based on a result of comparison between the first user information and the second user information. When the result of the comparison between the first user information and the second user information is a predetermined result, the setting module 302 performs the usage setting corresponding to the second user ID. When the result of the comparison between the first user information and the second user information is not the predetermined result, the setting module 302 does not perform the usage setting corresponding to the second user ID. In this case, only the usage setting corresponding to the first user ID may be performed.

This predetermined result is a result serving as a criterion for whether or not to perform the usage setting corresponding to the second user ID. For example, a case in which the matching of the full name indicated by the first user information and the full name indicated by the second user information corresponds to the predetermined result is described, but the matching of the other information described above may correspond to the predetermined result. When a plurality of pieces of information are included in each of the first user information and the second user information, the matching of a predetermined number or more of pieces of information may correspond to the predetermined result. The matching as used herein may be a partial match rather than a perfect match.

According to Modification Example 1-9, when the authentication has been executed for the user terminal 20 from which the service has been logged in to through use of the first user ID, the usage setting corresponding to the second user ID is performed based on the result of the comparison between the first user information and the second user information. Thus, the user can increase the upper limit amount of the card C associated with the second user ID without performing the possession authentication under a state in which the user has logged in through use of the second user ID, thereby enhancing the convenience of the user. Further, the matching between the first user information and the second user information is used as the condition, and hence even when a third party logs in through use of the illegally obtained user ID while logging in through use of his or her own user ID and executes the possession authentication from his or her user ID, the upper limit amount of the illegally obtained user ID is not increased, and hence the fraudulent use of the service is suppressed, thereby enhancing the security.

Modification Example 1-10

For example, there is a case in which the user changes the user terminal 20 to be used by himself or herself due to a change of the model of a smartphone or for another reason. In this case, the usage setting of the user terminal 20 before the change may be inherited in accordance with the fact that the possession authentication has been executed on the user terminal 20 after the change.

The service providing system S further includes the inheritance module 309 for causing the second user terminal 20B to inherit the usage setting of the first user terminal 20 when the authentication has been executed on the second user terminal 20B from which the service has been logged in to through use of the same user ID as that used for the first user terminal 20A after the execution of the authentication on the first user terminal 20A. That is, the terminal ID of the second user terminal 20B is different from the terminal ID of the first user terminal 20A, but the usage setting associated with the terminal ID of the first user terminal 20A is associated with the terminal ID of the second user terminal 20B due to the execution of the possession authentication on the second user terminal 20.

The providing module 304 provides a service based on the usage setting inherited by the second user terminal 20B. Modification Example 1-10 is different from the other modification examples only in that the usage setting inherited by the second user terminal 20B is used, and processing itself for providing a service based on the usage setting is the same as in the other modification examples.

According to Modification Example 1-10, when the authentication has been executed on the second user terminal 20 from which the service has been logged in to through use of the same user ID as that used for the first user terminal 20 after the execution of the authentication on the first user terminal 20, the second user terminal 20 inherits the usage setting of the first user terminal 20. Accordingly, the usage setting of the first user terminal 20 can be easily inherited, and the convenience of the user is enhanced. Further, even when a third party attempts to cause the usage setting to be inherited under the guise of having purchased a new user terminal 20, the possession authentication cannot be executed, and hence the usage setting is prevented from being illegally inherited, thereby enhancing the security.

In Modification Example 1-10, the case in which the usage setting of the first user terminal 20 is inherited when the user has executed the possession authentication on the second user terminal 20 has been described, but a setting of inheritance may be performed on the first user terminal 20. In this case, when the user inputs, from the second user terminal 20, information that can identify the setting of inheritance performed on the first user terminal 20, the second user terminal 20 inherits the usage setting of the first user terminal 20.

3-2. Modification Example of Second Embodiment

Figure 20:
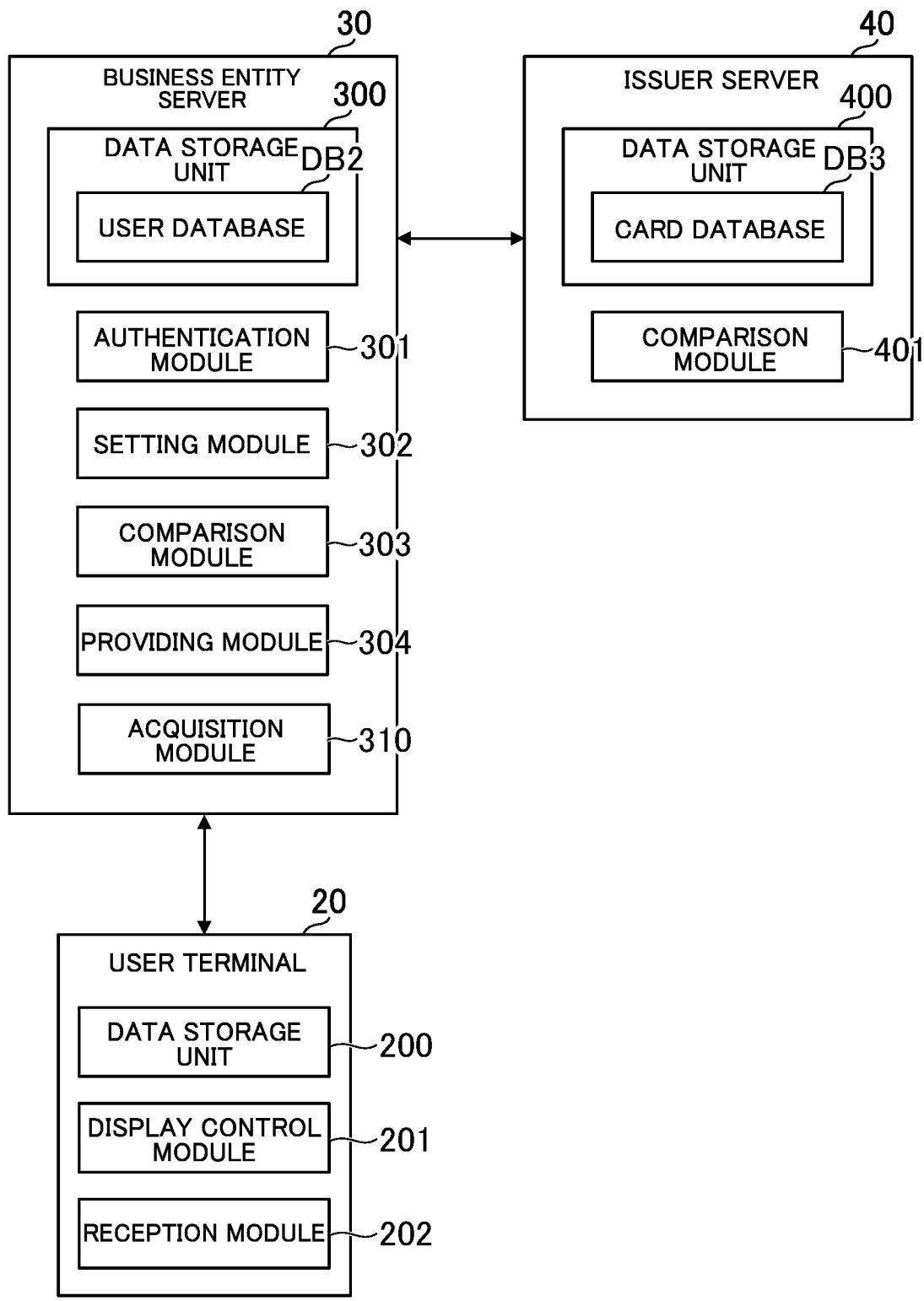
FIG. 20 is a functional block diagram in modification examples of the second embodiment.

Next, modification examples of the second embodiment are described. That is, modification examples relating to configurations in which the second setting for the second card C3 associated with the first card C2 is performed when the possession authentication for the first card C2 has been executed are described. FIG. 20 is a functional block diagram in the modification examples of the second embodiment. As illustrated in FIG. 20, in the modification examples described below, in addition to the functions described in the second embodiment, an acquisition module 310 is implemented. The acquisition module 310 is implemented mainly by the control unit 11.

Modification Example 2-1

In the second embodiment, the case in which the second setting is performed so that the upper limit amount of the second card C3 increases on condition that the first holdership information of the first card C2 for which the possession authentication has been executed and the second holdership information of the second card C3 match has been described as an example. An increase amount of the upper limit amount may be changed depending on a degree of matching between the first holdership information and the second holdership information.

The comparison module 401 in Modification Example 2-1 compares the first holdership information and the second holdership information to each other, and acquires the degree of matching between the first holdership information and the second holdership information. The degree of matching refers to a degree to which the first holdership information and the second holdership information match. For example, when each of the first holdership information and the second holdership information is expressed by a character, a number, or a combination thereof, the number of characters or number of digits that match between the first holdership information and the second holdership information corresponds to the degree of matching. The degree of matching may be a ratio of the number of characters or number of digits that match between the first holdership information and the second holdership information to the total number of characters or total number of digits of one of the first holdership information and the second holdership information that has the larger number of characters or the larger number of digits.

When the possession authentication has been executed, the setting module 302 performs the second setting based on the degree of matching. For example, the setting module 302 performs the second setting so that the restriction on the use of the service with the second card C3 is lifted to a greater extent as the degree of matching becomes higher. The setting module 302 performs the second setting so that the upper limit amount of the second card C3 increases as the degree of matching becomes higher. When the number of allowed times of use or the allowed time of use is set as the second setting, the setting module 302 may perform the usage setting of the number of allowed times of use or the allowed time of use so that the number of allowed times of use of the second card C3 becomes larger or the allowed time of use of the second card C3 becomes longer as the degree of matching becomes higher.

According to Modification Example 2-1, when the possession authentication has been executed, the second setting is performed based on the degree of matching between the first holdership information and the second holdership information, to thereby be able to perform a more flexible second setting. As a result, fraudulent use by a third party is effectively suppressed, and the security is further enhanced. From the viewpoint of the user as well, the convenience is enhanced by the flexible usage setting.

Modification Example 2-2

In the second embodiment, the case in which the second card C3 is a card that does not support the NFC authentication or image authentication has been described as an example. In this case, the second card C3 may be capable of the security code authentication, 3D Secure, or another authentication method.

The authentication module 301 in Modification Example 2-2 executes the possession authentication for the first card C2 based on a first authentication method. The NFC authentication or image authentication is an example of the first authentication method. The second card C3 is a card that does not support the first authentication method but supports a second authentication method. The security code authentication or 3D Secure is an example of the second authentication method. The second authentication method relates to authentication from different the first authentication method. In Modification Example 2-2, a case in which the second authentication method is an authentication method having lower security than that of the first authentication method is described, but the second authentication method may be an authentication method having higher security than that of the first authentication method. A combination of the first authentication method and the second authentication method may be any combination. Each of the first authentication method and the second authentication method may be any one of the above-mentioned authentication methods.

The authentication module 301 executes the authentication relating to the second card C3 based on the second authentication method. The authentication of the second authentication method may be the possession authentication or may not be the possession authentication. Accordingly, in Modification Example 2-2, the authentication of the second authentication method is referred to simply as "authentication" instead of being referred to as "possession authentication."

When the authentication relating to the second card C3 has been executed, the setting module 302 performs the second setting so that the use of the service is restricted to a greater extent than when the possession authentication relating to the first card C2 has been executed. For example, when the authentication for the second card C3 has been executed, the setting module 302 performs the second setting so that the increase amount of the upper limit amount becomes smaller than when the possession authentication for the first card C2 has been executed. In a case in which the number of allowed times of use or the allowed time of use is set as the second setting, when the authentication for the second card C3 has been executed, the setting module 302 performs the second setting so that the increase amount of the number of allowed times of use or the allowed time of use becomes smaller than when the possession authentication for the first card C2 has been executed.

According to Modification Example 2-2, when the authentication of the second authentication method relating to the second card C3 that does not support the first authentication method has been executed, the second setting is performed so that the use of the service is restricted to a greater extent than when the authentication relating to the first card C2 has been executed. This enhances the convenience of the user, and suppresses fraudulent use by a third party, thereby enhancing the security.

Modification Example 2-3

For example, in the service providing system S according to the second embodiment, the usage setting of the upper limit amount may also be performed for each user terminal 20 as in the first embodiment. Modification Example 2-3 is similar to Modification Example 1-1, but is different therefrom in that the upper limit amount of the second card C3 is increased when the possession authentication for the first card C2 has been executed. This point corresponds to the configuration in Modification Example 1-3, and hence Modification Example 2-3 is the same as Modification Example 1-3.

The authentication module 301 executes the possession authentication based on the authentication information received from the user terminal 20 of the user. The setting module 302 performs the second setting for each user terminal 20 when the possession authentication has been executed from this user terminal 20. The providing module 304 provides a service to each user terminal 20 based on the second setting of this user terminal 20. Those processes may be the same as those in Modification Example 1-3.

According to Modification Example 2-3, the second setting is performed for each user terminal 2 when the possession authentication has been executed from this user terminal 20, and a service is provided to each user terminal 20 based on the second setting of this user terminal 20. Accordingly, for the same reason as in the first embodiment, the fraudulent use of the service is suppressed, thereby enhancing the security, and the convenience of the user is enhanced as well.

Modification Example 2-4

For example, as in the second embodiment, the authentication module 301 can execute the possession authentication based on the authentication method selected by the user from a plurality of types of authentication methods.

In this case, when the possession authentication of the authentication method selected by the user has been executed, the setting module 302 may perform the second setting based on this authentication method. For example, when NFC authentication has been executed, the increase amount of the upper limit amount may be larger than when image authentication has been executed. It is assumed that a relationship between the authentication method and the increase amount of the upper limit amount (that is, setting content of the second setting) is defined in the data storage unit 300. The setting module 302 performs the second setting based on the associated with the increase amount authentication method selected by the user. As the security of this authentication method becomes higher, the increase amount becomes larger.

According to Modification Example 2-4, when the possession authentication has been executed based on the authentication method selected by the user from a plurality of types of authentication methods to execute the authentication of the authentication method selected by the user, the second setting is performed based on this authentication method. Accordingly, it is possible to set the upper limit amount relatively low when the possession authentication of the authentication method having relatively low security has been executed, and to set the upper limit amount relatively high when the possession authentication of the authentication method having relatively high security has been executed. As a result, the fraudulent use of the service can be suppressed.

Modification Example 2-5

For example, when a fraud degree of the user can be acquired in advance, the second setting corresponding to the fraud degree may be performed. The service providing system S further includes the acquisition module 310 for acquiring the fraud degree relating to the user in the service. The fraud degree is information indicating the degree of fraud or information indicating a level of suspicion of fraud. In Modification Example 2-5, a case in which the fraud degree is expressed by a score is described, but the fraud degree may be expressed by another index. For example, the fraud degree may be expressed by characters, for example, "S rank," "A rank," and "B rank."

For example, the acquisition module 310 calculates the fraud degree through use of a learning model. The learning model is a model using machine learning (artificial intelligence). As the machine learning itself, it is possible to use various known methods, and it is possible to use a method, for example, a neural network or deep learning. In the learning model, a relationship between an action that can be performed by the user and a determined result of whether or not the action is fraud has been learned. As the learning model, a model of unsupervised machine learning may be used.

The action is information indicating how the user has used a service. The action can also be said to be details of use of the service or a behavior at a time of use of the service. For example, an IP address of the user terminal 20, a URL accessed by the user terminal 20, a location of the user terminal 20, and an access date and time each correspond to the action of the user. In addition, for example, information on a frequency at which the user has used the service or an amount of money that has been used by the user in the service also corresponds to the action of the user.

It is assumed that data indicating the action of the user is stored in the data storage unit 300. This data is updated each time the user uses the service. The acquisition module 310 quantifies the action of the user, and inputs the action to the learning model to acquire the fraud degree output from the learning model. The learning model calculates a feature amount of the input action, and outputs the fraud degree corresponding to the feature amount. The acquisition module 310 acquires the fraud degree output from the learning model.

For example, the acquisition module 310 calculates the fraud degree so that the fraud degree becomes higher as the IP address varies more widely. Further, for example, the acquisition module 310 calculates the fraud degree so that the fraud degree becomes higher as the URL accessed by the user varies more widely. Further, for example, the acquisition module 310 calculates the fraud degree so that the fraud degree becomes higher as the access location is farther apart from the center of the use or the access location varies more widely.

Further, for example, the acquisition module 310 calculates the fraud degree so that the fraud degree becomes higher as the access date and time is farther apart from an average access date and time or the access date and time varies more widely. Further, for example, the acquisition module 310 calculates the fraud degree so that the fraud degree becomes higher as the access frequency is farther apart from an average access frequency or the access frequency varies more widely.

The fraud degree is only required to be calculated based on a predetermined method, and is not limited to the example using the learning model. For example, the acquisition module 310 may calculate the fraud degree of the user through use of not the learning model but a rule that defines a relationship between the action of the user and the fraud degree. In this case, the acquisition module 310 determines whether or not the action of the user matches the rule. When the action matches the rule, the fraud degree associated with the matched rule is obtained. In another case, for example, the acquisition module 310 may calculate the fraud degree by quantifying the action of the user and substituting the resultant into a predetermined calculation formula.

When the possession authentication has been executed, the setting module 302 performs the second setting based on the fraud degree. For example, the setting module 302 performs the second setting so that the restriction on the use of the service with the second card C3 is lifted to a greater extent as the fraud degree becomes lower. The setting module 302 performs the second setting so that the upper limit amount of the second card C3 increases as the fraud degree becomes lower. When the number of allowed times of use or the allowed time of use is set as the second setting, the setting module 302 may perform the usage setting of the number of allowed times of use or the allowed time of use so that the number of allowed times of use of the second card C3 becomes larger or the allowed time of use of the second card C3 becomes longer as the fraud degree becomes lower.

According to Modification Example 2-5, the second setting is performed based on the fraud degree relating to the user in the service. Accordingly, it is possible to set the upper limit amount relatively low when the fraud degree of the user is relatively high, and to set the upper limit amount relatively high when the fraud degree of the user is relatively low. As a result, the fraudulent use of the service can be suppressed.

Among storage areas of the IC chip cp of the first card C2, the storage area read in NFC authentication may be different based on the fraud degree of the user. For example, in a case in which the IC chip cp includes a first storage area which requires a key for reading by the reading unit and a second storage area which does not require a key for reading by the reading unit, the input electronic money ID may be acquired from the first storage area when the fraud degree of the user is equal to or more than a threshold value. When the fraud degree of the user is less than the threshold value, the input electronic money ID may be acquired from the second storage area. In this case, information indicating from which of the first storage area and the second storage area the input electronic money ID has been acquired may be transmitted to the business entity server 30, and the information may be confirmed in the possession authentication.

Further, which of the NFC unit 23A and the photographing unit 26 is to be used for authentication may be determined in accordance with the fraud degree of the user. For example, it may be determined to use the NFC unit 23A when the fraud degree is equal to or more than a threshold value, and to use the photographing unit 26 when the fraud degree is less than the threshold value. Conversely, it may be determined to use the photographing unit 26 when the fraud degree is equal to or more than the threshold value, and to use the NFC unit 23A when the fraud degree is less than the threshold value. As another example, it may be determined to use both the NFC unit 23A and the photographing unit 26 when the fraud degree is equal to or more than the threshold value, and to use any one of the NFC unit 23A and the photographing unit 26 when the fraud degree is less than the threshold value. Information for identifying which of the NFC unit 23A and the photographing unit 26 is determined to be used for authentication may be transmitted to the business entity server 30, and the information may be confirmed in the possession authentication.

Further, when the first card C2 includes a plurality of pieces of authentication information, the authentication information to be used for authentication may be determined based on the fraud degree of the user. For example, the authentication information to be used for authentication is determined so that as the fraud degree becomes higher, more authentication information is used for authentication. Moreover, for example, the authentication information to be used for authentication is determined so that as the fraud degree becomes lower, less authentication information is used for authentication. As another example, when the fraud degree is equal to or more than a threshold value, it is determined to use first authentication information having a relatively large amount of information, and when the fraud degree is less than the threshold value, it is determined to use second authentication information having a relatively small amount of information.

Modification Example 2-6

For example, as described in the second embodiment, it may be possible in the service to associate the plurality of second cards C3 with the first card C2. The number of second cards C3 to be associated with the first card C2 may be freely selected by the user. For this number, an upper limit number may be set.

When the possession authentication for the first card C2 has been executed, the setting module 302 performs the second setting based on the number of second cards C3 associated with the first card C2. For example, the setting module 302 performs the second setting so that the restriction on the use of the service with the second card C3 is lifted to a greater extent as the number becomes smaller. The setting module 302 performs the second setting so that the upper limit amount of the second card C3 increases as the number becomes smaller. When the number of allowed times of use or the allowed time of use is set as the second setting, the setting module 302 may perform the usage setting of the number of allowed times of use or the allowed time of use so that the number of allowed times of use of the second card C3 becomes larger or the allowed time of use of the second card C3 becomes longer as the number becomes smaller.

According to Modification Example 2-6, it is possible in the service to associate the plurality of second cards C3 with the first card C2, and when the authentication has been executed, the second setting is performed based on the number of second cards C3 associated with the first card C2. Accordingly, it is possible to suppress fraudulent use by a user with a high suspicion of fraud, such as a user who associates a large number of second cards C3 with the first card C2.

Modification Example 2-7

For example, when the authentication has been executed, the setting module 302 may perform the second setting based on at least one of the type of the first card C2 or the type of the second card C3. For example, when at least one of the first card C2 or the second card C3 is a card that has been frequently involved in fraud, the setting module 302 performs the second setting so that the upper limit amount becomes lower. When at least one of the first card C2 or the second card C3 is a card that has not been illegally used so frequently, the setting module 302 performs the second setting so that the upper limit amount becomes higher. Further, for example, when at least one of the first card C2 or the second card C3 is a rarely used card, the setting module 302 performs the second setting so that the upper limit amount becomes lower. When at least one of the first card C2 or the second card C3 is a frequently used card, the setting module 302 performs the second setting so that the upper limit amount becomes higher. Further, for example, when at least one of the first card C2 or the second card C3 is a debit card, the setting module 302 performs the second setting so that the upper limit amount becomes lower. When at least one of the first card C2 or the second card C3 is a credit card, the setting module 302 performs the second setting so that the upper limit amount becomes higher. It is assumed that a relationship between at least one type of the first card C2 or the second card C3 and the increase amount of the upper limit amount (that is, setting content of the second setting) is defined in advance in the data storage unit 300. The setting module 302 performs the second setting based on the increase amount associated with at least one of the type of the first card C2 or the type of the second card C3.

According to Modification Example 2-7, when the authentication has been executed, the second setting is performed based on at least one of the type of the first card C2 or the type of the second card C3. Accordingly, for example, when a specific type of card has been frequently involved in fraud, it is possible to lower the upper limit amount. As a result, the security is enhanced.

Modification Example 2-8

For example, as described in the second embodiment, each of a plurality of first cards C2 may be usable for the service. The authentication module 301 may be able to execute the possession authentication for each of the plurality of first cards C2. A method of executing the possession authentication for the individual first card C2 is as described in the second embodiment.

When the possession authentication for any one of the plurality of first cards C2 has been executed, the setting module 302 performs the first setting, which is a setting relating to the one of the plurality of first cards C2 for which the possession authentication has been executed, and the second setting, and is not required to perform the first setting for the first card C2 for which the possession authentication has not been executed. That is, it is assumed that a certain user has registered a first card C2A and a first card C2B.

The setting module 302 does not increase the upper limit amount of first the card C2B when the possession authentication for the first card C2A has been executed. The first card C2B is a card capable of the execution of the possession authentication, and hence the possession authentication for the first card C2B is required to be executed in order to increase the upper limit amount of the first card C2B. The flow in which the upper limit amount is increased when the possession authentication for the first card C2B has been executed is as described in the second embodiment.

According to Modification Example 2-8, the first setting for the first card C2 for which the possession authentication has not been executed is not performed when the possession authentication for any one of the plurality of first cards C2 has been executed. Accordingly, for example, when a third party illegally logs in and registers his or her own first card C2 without permission, the upper limit amounts of all the first cards C2 are prevented from increasing due to the execution of the possession authentication for the first card C2 registered by the third party, thereby enhancing the security.

Modification Example 2-9

For example, when the authentication module 301 can execute the possession authentication for each of the plurality of first cards C2 as in Modification Example 2-8, the setting module 302 may perform the second setting so that the restriction on the use of the service is lifted each time the possession authentication for each of the plurality of first cards C2 is successful. For example, it is assumed that three cards, namely, the first card C2A, the first card C2B, and the second card C3, have been registered under a certain user ID. The setting module 302 sets the upper limit amount of the second card C3 from 30,000 yen to 70,000 yen when the possession authentication for the first card C2A has been executed. The setting module 302 sets the upper limit amount of the second card C3 from 70,000 yen to 100,000 yen when the possession authentication for the second card C3B has been further executed. In this manner, the setting module 302 may perform the second setting so that the upper limit amount of the second card C3 gradually increases each time the possession authentication for each of the plurality of first cards C2 is successful.

According to Modification Example 2-9, the second setting is performed so that the restriction on the use of the service is lifted each time the possession authentication for each of the plurality of first cards C2 has been executed. Accordingly, it is possible to prevent the upper limit amount of the second card C3 from increasing too much at one time, and to raise the upper limit amount when the possession authentication for each of the plurality of first cards C2 has been executed and each of the plurality of first cards C2 can be trusted. As a result, the security is enhanced.

3-3. Other Modification Examples

For example, the modification examples described above may be combined.

For example, the service providing system S can be applied to any service other than the administrative service and the electronic payment service. For example, the service providing system S can be applied to other services such as an electronic commerce service, a travel reservation service, a communication service, a financial service, an insurance service, an auction services, or an SNS. In a case of applying the service providing system S according to the first embodiment to other services, it suffices to perform the usage setting for the user terminal 20 when the possession authentication or other predetermined authentication has been executed from this user terminal 20 under a state in which the user has logged in to each of those other services. It suffices that this usage setting is a setting that corresponds to each individual service, such as an amount of money by which purchase is allowed with one order, a frequency of purchase, a time of purchase, the number of facilities that can be reserved, the number of base stations that can be used, or an amount of money that can be remitted. In the same manner, in a case of applying the service providing system S according to the second embodiment to other services, it suffices to perform the usage setting for a card for which the possession authentication or other predetermined authentication has not been executed.

For example, the card to be utilized for the possession authentication may also be an insurance card, a driver's license, a membership card, a student ID card, or another card. The card to be utilized for the possession authentication may be an electronic card (virtual card) instead of a physical card. Further, for example, when the possession authentication fails, the determination may be manually performed by an administrator. Further, for example, when the possession authentication corresponding to a certain card number fails a predetermined number of times, the card number may be restricted so that no further possession authentication is executed thereon. In this case, the card may be restricted so that the card is not registered in the app unless permission is granted by the administrator. As another example, the possession authentication may be executed by reading an information storage medium.

For example, a case in which the main functions are implemented by the server 10 or the business entity server 30 has been described, but each function may be shared by a plurality of computers.

The invention claimed is:

1. A service providing system for providing a service allowed to be logged in to from each of a plurality of user terminals, the service providing system comprising at least one processor configured to:
 execute a first authentication, according to a first authentication method for each of the plurality of user terminals, to allow a user to login to the service in each of the plurality of user terminals;
 execute predetermined authentication for each of the plurality of user terminals according to a second authentication method under a state in which the service has been logged in to from each of the plurality of user terminals;
 wherein the first authentication method and the second authentication method are different;
 perform a setting relating to the service for each of the plurality of user terminals based on whether the predetermined authentication has been executed from each of the plurality of user terminals;
 wherein the setting is a permitted range of the use of the service;
 wherein if the user terminal has executed the first authentication but has not executed the predetermined authentication, the setting is a first permitted range of use, and if the user terminal has executed the first authentication and the predetermined authentication, the setting is a second permitted range of use, wherein the first permitted range of use is more restrictive than the second permitted range of use;
 provide the service to each of the plurality of user terminals based on the setting of each of the plurality of user terminals;
 wherein the predetermined authentication is possession authentication for confirming whether a predetermined card is possessed through use of one of the plurality of user terminals, and
 wherein the at least one processor is configured to perform the setting for each of the plurality of user terminals based on whether the possession authentication has been executed from each of the plurality of user terminals;
 wherein the possession authentication involves confirming that a first card associated with user identification information used for login to the service is possessed by the user,
 wherein the setting is a setting to be performed when the service is used with a second card previously associated with the user identification information,
 wherein the setting is a setting to increase access to the service, wherein the at least one processor is configured to:
 perform the setting for the second card for each of the plurality of user terminals based on whether the possession authentication for the first card has been executed from each of the plurality of user terminals, and provide the service to each of the plurality of user terminals based on the setting of each of the plurality of user terminals for the second card.

2. The service providing system according to claim 1, wherein the service is allowed to be logged in to from each of the plurality of user terminals through use of a same user identification information,
wherein the at least one processor is configured to:
execute the predetermined authentication for each of the plurality of user terminals under a state in which the service has been logged in to from each of the plurality of user terminals through use of the user identification information,
perform the setting for each combination of one of the plurality of user terminals and the user identification information based on whether the predetermined authentication has been executed under a state in which the service has been logged in to from the one of the plurality of user terminals through use of the user identification information, and
provide the service for each combination of one of the plurality of user terminals and the user identification information based on the setting of each combination.

3. The service providing system according to claim 1, wherein the at least one processor is configured to:
acquire, for each of the plurality of user terminals, a reliability level relating to each of the plurality of user terminals based on whether the predetermined authentication has been executed, and
perform the setting for each of the plurality of user terminals based on the reliability level of each of the plurality of user terminals.

4. The service providing system according to claim 1, wherein the possession authentication involves confirming whether a first card associated with user identification information used for login to the service is possessed,
wherein the setting is a setting to be performed when the service is used with a second card associated with the user identification information,
wherein the at least one processor is configured to:
perform the setting for the second card for each of the plurality of user terminals based on whether the possession authentication for the first card has been executed from each of the plurality of user terminals, and
provide the service to each of the plurality of user terminals based on the setting of each of the plurality of user terminals for the second card.

5. The service providing system according to claim 4, wherein the at least one processor is configured to:
compare first holdership information relating to holdership of the first card and second holdership information relating to holdership of the second card, and
perform the setting for the second card for each of the plurality of user terminals based on whether the possession authentication for the first card has been executed from each of the plurality of user terminals and on a result of the comparison between the first holdership information and the second holdership information.

6. The service providing system according to claim 4, wherein the second card is a card for which the possession authentication is unsupported, and
wherein the at least one processor is configured to perform the setting for the second card for which the possession authentication has been unexecuted for each of the plurality of user terminals based on whether the possession authentication for the first card has been executed from each of the plurality of user terminals.

7. The service providing system according to claim 1, wherein the at least one processor is configured to:
change the setting for each of the plurality of user terminals based on a use status of the service from each of the plurality of user terminals, and
provide the service to each of the plurality of user terminals based on the setting of each of the plurality of user terminals which has been changed.

8. The service providing system according to claim 1, wherein the service is allowed to be logged in to from a same user terminal through use of each of a plurality of pieces of user identification information,
wherein the at least one processor is configured to:
execute the predetermined authentication for each of the plurality of user terminals under a state in which the service has been logged in to from each of the plurality of user terminals through use of one of the plurality of pieces of user identification information,
perform the setting for each combination of one of the plurality of user terminals and one of the plurality of pieces of user identification information based on whether the predetermined authentication has been executed under a state in which the service has been logged in to from the one of the plurality of user terminals through use of the one of the plurality of pieces of user identification information, and
provide the service for each combination of one of the plurality of user terminals and one of the plurality of pieces of user identification information based on the setting of each combination.

9. The service providing system according to claim 8, wherein the plurality of pieces of user identification information include first user identification information and second user identification information,
wherein the at least one processor is configured to:
execute the predetermined authentication for one of the plurality of user terminals from which the service has been logged in to through use of the first user identification information,
perform, when the predetermined authentication for the one of the plurality of user terminals from which the service has been logged in to through use of the first user identification information has been executed, the setting corresponding to the second user identification information that has ever been used for login from the one of the plurality of user terminals, and
provide, based on the setting corresponding to the second user identification information, the service to the one of the plurality of user terminals from which the service has been logged in to through use of the second user identification information.

10. The service providing system according to claim 9, wherein the at least one processor is configured to:
compare first user information associated with the first user identification information and second user information associated with the second user identification information to each other, and
perform, when the predetermined authentication for the one of the plurality of user terminals from which the service has been logged in to through use of the first user identification information has been executed, the setting corresponding to the second user identification information based on a result of the comparison between the first user information and the second user information.

11. The service providing system according to claim 1, wherein the at least one processor is configured to:
cause a second user terminal to inherit the setting of a first user terminal when the predetermined authentication has been executed on the second user terminal from which the service has been logged in to through use of a same user identification information as a user identification information used for the first user terminal after the predetermined authentication has been executed on the first user terminal, and
provide the service based on the setting inherited by the second user terminal.

12. The service providing system according to claim 1, wherein the service is an electronic payment service,
wherein the setting is a setting of an upper limit amount in the electronic payment service, and
wherein the at least one processor is configured to perform, for each of the plurality of user terminals, when the predetermined authentication has been executed, the setting so that the upper limit amount increases.

13. A service providing method for providing a service allowed to be logged in to from each of a plurality of user terminals, the service providing method comprising:
executing a first authentication, according to a first authentication method for each of the plurality of user terminals, to allow a user to login to the service in each of the plurality of user terminals;
executing predetermined authentication for each of the plurality of user terminals according to a second authentication method under a state in which the service has been logged in to from each of the plurality of user terminals;
wherein the first authentication method and the second authentication method are different;
performing a setting relating to the service for each of the plurality of user terminals based on whether the predetermined authentication has been executed from each of the plurality of user terminals;
wherein the setting is a permitted range of the use of the service;
wherein if the user terminal has executed the first authentication but has not executed the predetermined authentication, the setting is a first permitted range of use, and if the user terminal has executed the first authentication and the predetermined authentication, the setting is a second permitted range of use, wherein the first permitted range of use is more restrictive than the second permitted range of use;
providing the service to each of the plurality of user terminals based on the setting of each of the plurality of user terminals;
wherein the predetermined authentication is possession authentication for confirming whether a predetermined card is possessed through use of one of the plurality of user terminals, and
performing the setting for each of the plurality of user terminals based on whether the possession authentication has been executed from each of the plurality of user terminals;
wherein the possession authentication involves confirming that a first card associated with user identification information used for login to the service is possessed by the user,
wherein the setting is a setting to be performed when the service is used with a second card previously associated with the user identification information,
wherein the setting is a setting to increase access to the service,
performing the setting for the second card for each of the plurality of user terminals based on whether the possession authentication for the first card has been executed from each of the plurality of user terminals, and
providing the service to each of the plurality of user terminals based on the setting of each of the plurality of user terminals for the second card.

14. A non-transitory computer-readable information storage medium for storing a program for causing a computer, which is configured to provide a service allowed to be logged in to from each of a plurality of user terminals, to:
execute a first authentication, according to a first authentication method for each of the plurality of user terminals, to allow a user to login to the service in each of the plurality of user terminals;
execute predetermined authentication for each of the plurality of user terminals according to a second authentication method under a state in which the service has been logged in to from each of the plurality of user terminals;
wherein the first authentication method and the second authentication method are different;
perform a setting relating to the service for each of the plurality of user terminals based on whether the predetermined authentication has been executed from each of the plurality of user terminals;
wherein the setting is a permitted range of the use of the service;
wherein if the user terminal has executed the first authentication but has not executed the predetermined authentication, the setting is a first permitted range of use, and if the user terminal has executed the first authentication and the predetermined authentication, the setting is a second permitted range of use, wherein the first permitted range of use is more restrictive than the second permitted range of use;
provide the service to each of the plurality of user terminals based on the setting of each of the plurality of user terminals;
wherein the predetermined authentication is possession authentication for confirming whether a predetermined card is possessed through use of one of the plurality of user terminals, and
perform the setting for each of the plurality of user terminals based on whether the possession authentication has been executed from each of the plurality of user terminals;
wherein the possession authentication involves confirming that a first card associated with user identification information used for login to the service is possessed by the user,
wherein the setting is a setting to be performed when the service is used with a second card previously associated with the user identification information,
wherein the setting is a setting to increase access to the service,
perform the setting for the second card for each of the plurality of user terminals based on whether the possession authentication for the first card has been executed from each of the plurality of user terminals, and provide the service to each of the plurality of user terminals based on the setting of each of the plurality of user terminals for the second card.

\* \* \* \* \*